United States Patent
Fujiwara et al.

(10) Patent No.: US 9,306,670 B2
(45) Date of Patent: Apr. 5, 2016

(54) OPTICAL COUPLING/SPLITTING DEVICE, TWO-WAY OPTICAL PROPAGATION DEVICE, AND OPTICAL TRANSMIT-RECEIVE SYSTEM

(71) Applicant: NIPPON TELEGRAPH AND TELEPHONE CORPORATION, Tokyo (JP)

(72) Inventors: Masamichi Fujiwara, Yokosuka (JP); Kenichi Suzuki, Yokosuka (JP); Naoto Yoshimoto, Yokosuka (JP); Manabu Oguma, Atsugi (JP); Toshio Watanabe, Atsugi (JP); Hiroshi Takahashi, Atsugi (JP); Hiromasa Tanobe, Atsugi (JP); Tsutomu Kitoh, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 90 days.

(21) Appl. No.: 14/240,582

(22) PCT Filed: Sep. 27, 2012

(86) PCT No.: PCT/JP2012/006196
§ 371 (c)(1),
(2) Date: Feb. 24, 2014

(87) PCT Pub. No.: WO2013/046696
PCT Pub. Date: Apr. 4, 2013

(65) Prior Publication Data
US 2014/0186040 A1     Jul. 3, 2014

(30) Foreign Application Priority Data

Sep. 27, 2011 (JP) ................................. 2011-211314
Sep. 27, 2011 (JP) ................................. 2011-211316
Sep. 27, 2011 (JP) ................................. 2011-211318

(51) Int. Cl.
*H04B 10/27*     (2013.01)
*H04B 10/272*    (2013.01)
(Continued)

(52) U.S. Cl.
CPC .............. *H04B 10/27* (2013.01); *G02B 6/2808* (2013.01); *H04B 10/272* (2013.01);
(Continued)

(58) Field of Classification Search
CPC .... H04B 10/27; H04B 10/272; G02B 6/2808; G02B 6/02047; G02B 6/0283; G02B 6/03633; G02B 6/12007; G02B 6/125; G02B 6/14; G02B 6/2813; G02B 6/2821; G02B 6/30
See application file for complete search history.

(56) References Cited

U.S. PATENT DOCUMENTS

| | | | |
|---|---|---|---|
| 5,949,931 | A  | 9/1999 | Kitamura |
| 6,393,189 | B1 | 5/2002 | Mimura et al. |
| 2012/0148241 | A1 | 6/2012 | Piehler et al. |

FOREIGN PATENT DOCUMENTS

| | | |
|---|---|---|
| JP | S62-18131  | 1/1987 |
| JP | H01-108509 | 4/1989 |

(Continued)

OTHER PUBLICATIONS

Nakanishi et al.; "A Low Loss Multiplexing Scheme for PDS System" in Joint Meeting of the Institute of Electronics, Information and Communication Engineers of 1997, B-10-112, p. 621.
(Continued)

*Primary Examiner* — Darren E Wolf
(74) *Attorney, Agent, or Firm* — Workman Nydegger

(57) ABSTRACT

The present invention relates to an optical coupling/splitting device that realizes the splitting of a down-signal and the coupling of up-signals by the same optical device, and reduces coupling losses of the up-signal. An optical coupling/splitting device in the present invention comprises an optical coupling/splitting means for coupling a plurality of up-signals in a multi-mode for output and splitting a down-signal in a single mode for output, and a two-way optical propagation means for propagating the up-signal that is output from the optical coupling/splitting means in a multi-mode for output and propagate the down-signal in a single mode to be output to the optical coupling/splitting means.

15 Claims, 26 Drawing Sheets

(51) Int. Cl.
*H04J 14/02* (2006.01)
*G02B 6/28* (2006.01)
*G02B 6/42* (2006.01)
*G02B 6/02* (2006.01)
*G02B 6/036* (2006.01)
*G02B 6/125* (2006.01)
*G02B 6/30* (2006.01)
*G02B 6/028* (2006.01)
*G02B 6/12* (2006.01)
*G02B 6/14* (2006.01)

(52) U.S. Cl.
CPC .......... *G02B 6/02047* (2013.01); *G02B 6/0283* (2013.01); *G02B 6/03633* (2013.01); *G02B 6/125* (2013.01); *G02B 6/12007* (2013.01); *G02B 6/14* (2013.01); *G02B 6/2813* (2013.01); *G02B 6/2821* (2013.01); *G02B 6/30* (2013.01); *G02B 6/4215* (2013.01); *G02B 2006/12109* (2013.01); *H04J 14/0242* (2013.01); *H04J 14/0245* (2013.01); *H04J 14/0249* (2013.01)

(56) References Cited

FOREIGN PATENT DOCUMENTS

| | | |
|---|---|---|
| JP | H01-155007 | 9/1989 |
| JP | H10-048458 | 2/1998 |
| JP | 2000-241649 | 9/2000 |
| JP | 2003-270496 | 9/2003 |
| JP | 2005-134668 | 5/2005 |
| JP | 2006-039080 | 2/2006 |
| JP | 2010-049064 | 3/2010 |
| JP | 2010-118856 | 5/2010 |
| JP | 2011-086714 | 4/2011 |
| JP | 2011-146966 | 7/2011 |

OTHER PUBLICATIONS

Hanada et al. "8×1 Single-Mode to Multi-Mode Combiner Using Silica Based Waveguide," In Society Meeting of the institute of Electronics, Information and Communication Engineers of 1996, C-160, p. 160.

Sasaoka et al.; "Silica Based Waveguide Type of 16×1 Optical Mode Combiner," In Joint Meeting of the Institute of Electronics, Information and Communication Engineers of 1998, C-3-163, p. 329.

Lindstrom et al; "Combined Multimode and Single Mode Fiber," Optical Fiber Communication Conference and Exhibit, 2002. OFC 2002, Mar. 2002, pp. 628-629.

Tajima et al., "Single Mode to Multi Mode 8×8 Splitter-Combiner Optical Switch," NEC Opto-Electronics Research Laboratories, 1996, p. 615.

David Piehler, "PICs in PONs", OFC/NFOEC Technical Digest, Jan. 23, 2012, 3 pages.

Cheng et al., "Large Splitting and Long Reach Passive Optical Networks with Mode Coupling Receivers," ECOC 2010, Sep. 2010, 3 pages.

David Piehler, "Implementing High [> 2048] Split Ratios in any PON," OSA/OFC/NFOEC 2011, 3 pages.

De Vos et al., "Demonstration of extended split APON," OFC 2002, pp. 437-439.

Raharimanitra et al., "Demonstration of the use of an Optical Fibre Combiner with Low Loss to connect Four Single Mode Fibres to one Photo-receiver," OSA / ANIC 2010, 2 pages.

International Preliminary Report on Patentability and Written Opinion in corresponding App. No. PCT/JP2012/006196 dated Apr. 10, 2014.

Office Action in corresponding Korean Patent Application No. 10-2014-7004988 dated Jun. 8, 2015.

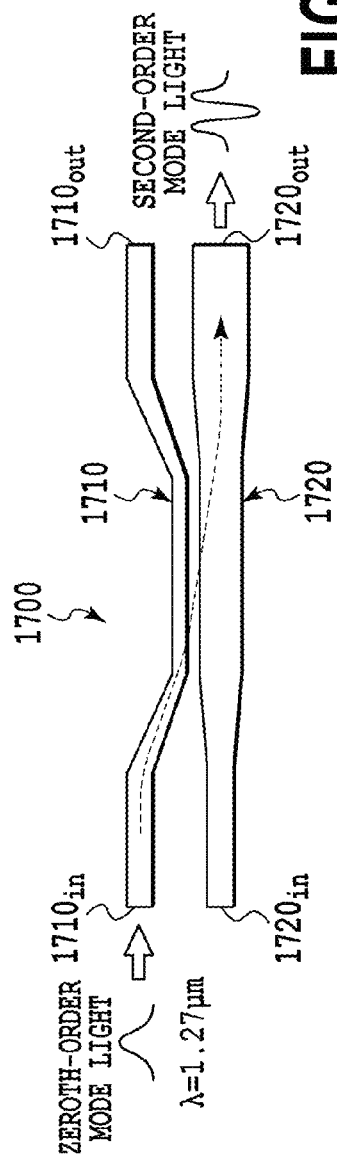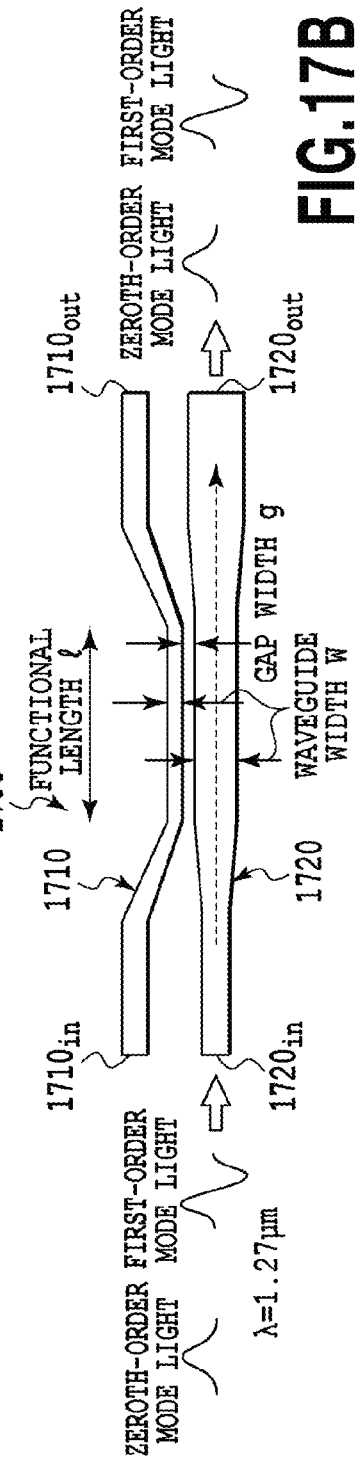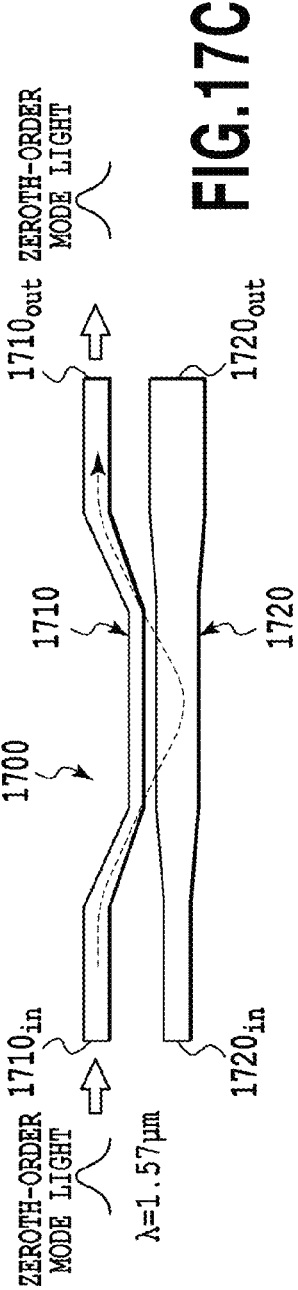

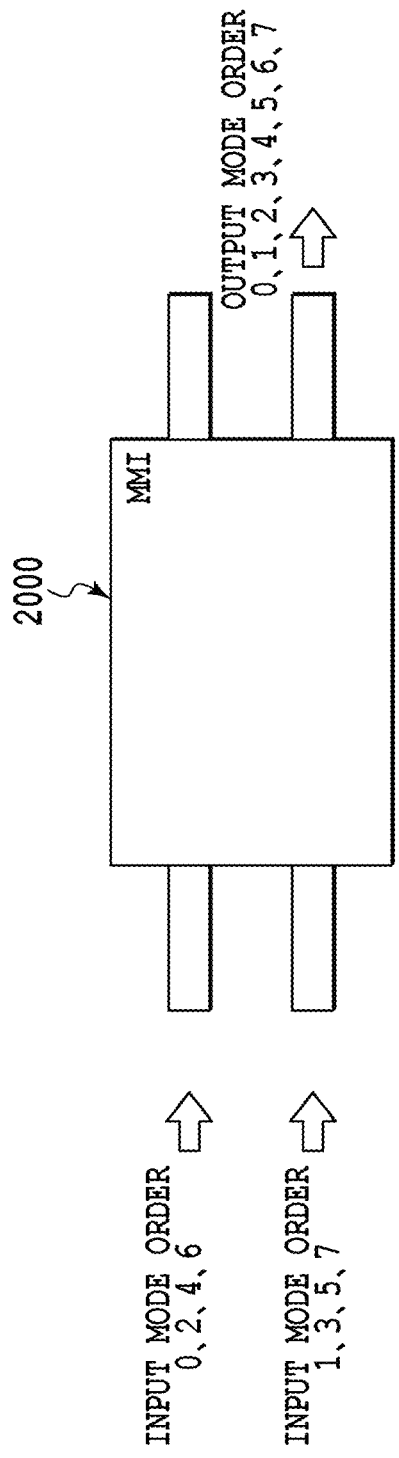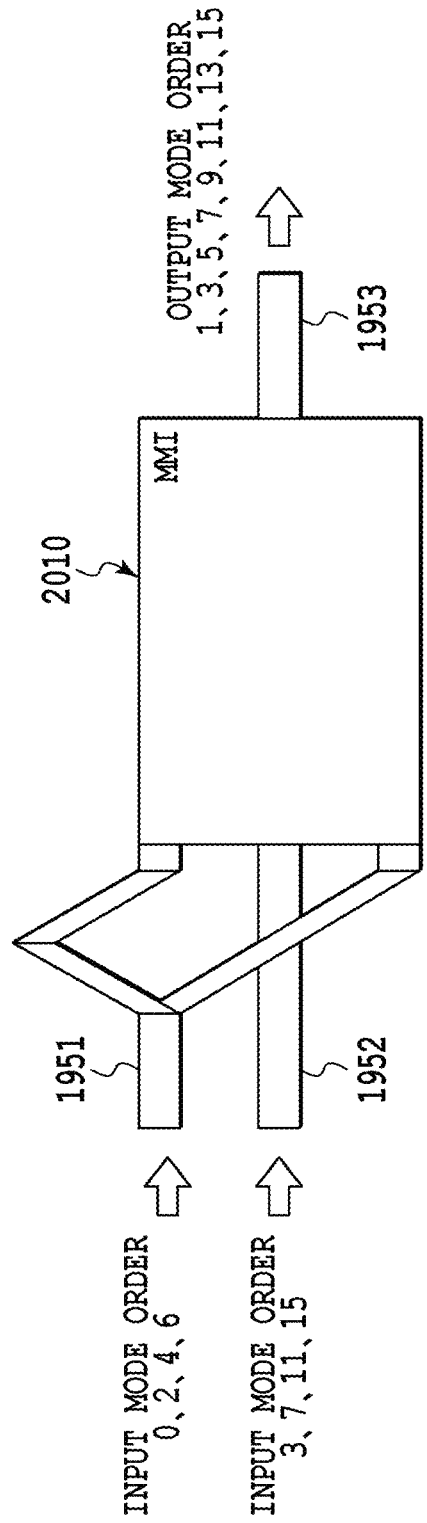

US 9,306,670 B2

OPTICAL COUPLING/SPLITTING DEVICE, TWO-WAY OPTICAL PROPAGATION DEVICE, AND OPTICAL-TRANSMIT-RECEIVE SYSTEM

TECHNICAL FIELD

The present invention relates to an optical coupling/splitting device, an two-way optical propagation device and an optical transmit-receive system that are used in an optical subscriber network.

BACKGROUND ART

In the optical subscriber network system, a passive optical network (PON) system that is standardized in IEEE or ITU-T is widely adopted. The PON system is configured such that optical network units (ONU) that are arranged respectively to a plurality of subscriber devices are connected to an optical line terminal (OLT) arranged in the accommodation station through optical splitting device and one optical fiber arranged inside and outside the accommodation station.

In the PON system, an up-signal and a down-signal are transmitted bi-directionally on the same optical fiber by different wavelengths. The down-signal is a successive signal formed by multiplexing signals that are output from the OLT by using a time division multiplexing (TDM) technology. The ONU located in the subscriber device takes out a time slot signal required for the ONU itself from the successive signals split in the optical splitting device. In addition, the up-signals are burst signals that are intermittently transmitted from the ONU, and are coupled in the optical splitting device to produce a TDM signal, which is sent to the accommodation station.

Since the up-signal varies in intensity depending on a difference in distance from the subscriber device to the optical splitting device or an individual difference of transmitter output in the ONU, a wide input dynamic range is required for the receiver. In the PON system, the OLT and a few pieces of the optical fibers arranged in the accommodation station can be commonly used among a plurality of subscriber devices by using the TDM technology. Therefore it is possible to economically provide an optical access service at a high speed exceeding gigabits.

However, the PON system has been already put into practice, but, expansion of an allowance transmission loss budget is still demanded. When the expansion of the loss budget can be realized, an accommodation efficiency of the PON system can be improved "by increasing the split number to increase the number of the subscriber devices that one OLT accommodates" or "by lengthening the optical fiber transmission path to expand the accommodation area".

For realizing the expansion of the loss budget, there is widely considered a method in which an two-way optical amplifier that individually amplifies the up/down signal is used to compensate for losses of the multi-splitting optical splitting device or the lengthened optical fiber transmission path. In many cases, however, it is assumed that the two-way optical amplifier is arranged in the optical fiber transmission path to be used as a relay. Considering the easiness of ensuring a power source for driving the two-way optical amplifier, it is desirable that the two-way optical amplifier is arranged in the accommodation station and the optical amplifier for amplifying the up/down signal is used as a front-side optical amplifier and a rear-side optical amplifier respectively.

In a case of arranging the front-side optical amplifier in the accommodation station for use, however, when a strenuous burst optical signal is incident to the front-side optical amplifier, there occurs a problem that an optical signal exceeding an input dynamic range reaches the receiver in the accommodation station, the up-signal cannot be normally received.

On the other hand, NPL 1 proposes a method in which coupling losses of the up-signal in the optical splitting device are reduced, thereby obtaining the effect similar to a case of equivalently expanding the loss budget by the reduced loss amount.

FIG. 1 shows the configuration of a PON system 100 shown in NPL 1. In FIG. 1, there is shown the PON system 100 in which an ONU 111 that is arranged in each of subscriber devices 110 is connected to an OLT 136 in an accommodation station 130 through an optical splitting device 120. The accommodation station 130 is provided with wavelength multiplexing/demultiplexing devices 131, an optical splitting device 132, an optical coupling device 133, and the OLT 136 including a transmitter 134 and a receiver 135. It should be noted that in FIG. 1, the OLT 136 is formed of the transmitter 134 and the receiver 135, but may include the wavelength multiplexing/demultiplexing device, the optical splitting device and the optical coupling device.

In the PON system 100 exemplified in FIG. 1, in addition to split an optical signal by the optical splitting device 120 arranged outside of the accommodation station 130, the optical signal is split also inside of the accommodation station 130 (a case of four splits is shown in FIG. 4). Further, in the PON system 100 exemplified in FIG. 1, one optical splitting device 132, one optical coupling device 133, and wavelength multiplexing/demultiplexing devices 131 in number equal to the split number inside of the accommodation station are used to perform the splitting of the down-signal and the coupling of the up-signal inside of the accommodation station 130 simultaneously.

In the PON system 100, the down-signal transmitted from the transmitter 134 is split by the optical splitting device 132, and the split down-signals are sent to the wavelength multiplexing/demultiplexing devices 131 respectively. The optical splitting device 132, as described above, can perform the coupling of the up-signals at the same time with the splitting of the down-signal, but in the PON system 100, only the splitting of the down-signal is performed. On the other hand, the up-signal of each split inside of the station is multiplexed/demultiplexed from the down-signal in the wavelength multiplexing/demultiplexing device 131. Further, the multiplexed/demultiplexed up-signals are multiplexed in the optical coupling device called a mode coupler, which thereafter, is received in the receiver.

FIG. 2A and FIG. 2B are configuration examples of the optical coupling devices. FIG. 2A shows the configuration example of the optical coupling device using a planer lightwave circuit (PLC), and FIG. 2B is the configuration example of the optical coupling device using a fusion single mode fiber (SMF) waveguide. FIG. 2A shows a conventional optical coupling device 200 provided with a multi-mode fiber (MMF) 210 and a PLC 220. FIG. 2B shows a conventional optical coupling device 200 provided with the MMF 210 and a fusion SMF waveguide 230. The MMF 210 has a clad 211 and a core 212, and an up-signal is propagated through the core 212 for transmission.

The PLC 220 shown in FIG. 2A includes a slab waveguide 221, and a SM waveguide 222 connected to the slab waveguide 221. The fusion SMF waveguide 230 shown in FIG. 2B includes a fusion portion 231 and a SMF 232 fusion-connected to the fusion portion 231. Any of the optical coupling devices shown in FIG. 2A and FIG. 2B has the configuration of bundling the plural SM waveguides 222 or one-end surfaces of the SMFs 232, which are radially arranged on a plane. The coupling of optical signals in the optical coupling device is performed in each of the slab waveguide 221 and the fusion portion 231 shown in FIG. 2A and FIG. 2B.

Each of the optical coupling devices shown in FIG. 2A and FIG. 2B keeps the confinement of optical signals incident from the other end surface of the SM waveguides 222 or the SMFs 232 in a planar vertical direction, and at the same time, eliminates the boundary between the respective SM waveguides 222 or between the respective SMFs 232. In this state, the optical signals are coupled after proceeding by a predetermined distance. Since a mode field diameter of the coupled optical signal is wider than a mode field diameter of the SM waveguide 222 or the SMF 232, the MMF 210 is connected to the coupling portion of the optical signals, and the coupled optical signal is confined in the optical fiber without leakage. Consequently, it is possible to overcome the lacking of the optical splitting device that the coupling loss is in principle increased according to an increase in the split number (1/N in N×1 splits).

In fact, as shown in NPL 2, in a case of the optical coupling device of 8×1 by the configuration shown in FIG. 2A, although the principle loss is 9 dB in a conventional splitter circuit by a combination of Y splitting elements as in the case of the slab waveguide, the coupling loss within 2 dB is realized. In addition, as shown in NPL 3, in a case of the optical coupling device of 16×1, the principle loss is 12 dB, but an improvement of the principle loss equal to or more than 7 dB, that is, the worst coupling loss is equal to or less than 5 dB, is realized.

CITATION LIST

Non Patent Literature

NPL1: "A low loss multiplexing scheme for PDS system" in Joint Meeting of The institute of Electronics, Information and Communication Engineers of 1997, B-10-112, Page 621, by Kenji Nakanishi, Seiji Yoshida, and Sinichi Aoyagi.
NPL2: "8×1 Single-Mode to Multi-Mode Combiner Using Silica Based Waveguide" In Society Meeting of The institute of Electronics, Information and Communication Engineers of 1996, C-160, Page 160, by Tadahiko Hanada, Naoki Kitamura, Tsuyoshi Shimoda, and Mitsuhiro Kitamura.
NPL3: "Silica based waveguide type of 16×1 optical mode combiner" In Joint Meeting of The institute of Electronics, Information and Communication Engineers of 1998, C-3-163, Page 329, by Eisuke Sasaoka, Hitoshi Hatayama, Dai Yui, and Tetsuya Hattori.

SUMMARY OF INVENTION

Technical Problem

In the conventional system configuration shown in each of FIG. 1, FIG. 2A and FIG. 2B, different optical devices are required in regard to the splitting of the down-signal and the coupling of the up-signal respectively. Therefore the configuration of the system becomes complicated, and the number of components to be prepared increases. There occurs a problem such as an increase on initial investment costs of the system, an increase in size on the transmission device, reliability degradation due to the increased components or the complicated process, or the like.

Solution to Problem

For achieving the above object, an optical coupling/splitting device according to claim 1 in the present invention comprises an optical coupling/splitting means for coupling a plurality of up-signals in a multi-mode for output and splitting a down-signal in a single mode for output, and an two-way optical propagation means for propagating the up-signal that is output from the optical coupling/splitting means in a multi-mode for output and propagate the down-signal in a single mode to be output to the optical coupling/splitting means.

An optical coupling/splitting device according to claim 2 in the present invention comprises the optical coupling/splitting device according to claim 1 in the present invention, wherein the two-way optical propagation means is formed of a dual-mode optical fiber.

An optical coupling/splitting device according to claim 3 in the present invention comprises the optical coupling/splitting device according to claim 2 in the present invention, wherein a diameter of a clad used in single mode propagation of the dual-mode optical fiber is reduced in a tapered shape from one end of the dual-mode optical fiber.

An optical coupling/splitting device according to claim 4 in the present invention comprises the optical coupling/splitting device according to claim 2 or 3 in the present invention, further comprising a multiplexing/demultiplexing means for demultiplexing the up-signal that propagates in the dual-mode optical fiber in a multi-mode and multiplex the down-signals in a single mode.

An optical coupling/splitting device according to claim 5 in the present invention comprises the optical coupling/splitting device according to claim 1 in the present invention, wherein the two-way optical propagation means is formed of a space lens system, the space lens system being configured in such a manner that the up-signal that is output from the optical coupling/splitting means is transmitted therein to be output in a multi-mode and the down-signal is transmitted therein to be output to the optical coupling/splitting means in a single mode.

An optical transmit-receive system according to claim 6 in the present invention comprises the optical coupling/splitting device according to claim 4 or 5 in the present invention, to which a transmitter for transmitting the down-signal and a receiver for receiving the coupled up-signal are connected.

An optical transmit-receive system according to claim 7 in the present invention comprises the optical transmit-receive system according to claim 6 in the present invention, wherein an optical amplifier for amplifying the down-signal is connected to the transmitter.

An optical coupling/splitting device according to claim 8 in the present invention comprises the optical coupling/splitting device according to claim 2 in the present invention, wherein the optical coupling/splitting means includes a slab waveguide that is formed in a planar lightwave circuit and is optically connected to the dual-mode optical fiber, and a plurality of single mode waveguides that are optically connected to the slab waveguide and a plurality of single mode optical fibers, wherein the slab waveguide includes a core lacking portion that is provided on an optical axis extension line of the dual-mode optical fiber to be line-symmetric around the optical axis extension line of the dual-mode optical fiber.

An optical coupling/splitting device according to claim 9 in the present invention comprises the optical coupling/splitting device according to claim 8 in the present invention, wherein the core lacking portion is formed in an elliptical shape.

An optical coupling/splitting device according to claim 10 in the present invention comprises the optical coupling/splitting device according to claim 9 in the present invention, wherein the core lacking portion includes a plurality of first core lacking sections provided in an opening angle range of a multi-mode portion in the dual-mode optical fiber, and a second core lacking section provided in an opening angle range of a single-mode portion of the dual-mode optical fiber, wherein the second core lacking section has curvature that is larger than that of each of the first core lacking sections.

An optical coupling/splitting device according to claim 11 in the present invention comprises the optical coupling/splitting device according to any of claims 8 to 10 in the present invention, wherein the slab waveguide is formed of a reflection rate intensifying structure configured to reflect the down-signal and the up-signal for being confined in the slab waveguide.

An optical coupling/splitting device according to claim 12 in the present invention comprises the optical coupling/splitting device according to any of claims 8 to 11 in the present invention, wherein waveguide widths of the single-mode waveguides respectively differ from each other in a connecting portion to the slab waveguide, and points where optical axis extension lines of the single-mode waveguides in the connecting portion cross an optical axis extension line of the dual-mode optical fiber differ from each other for each of the single-mode waveguides.

An optical coupling/splitting device according to claim 13 in the present invention comprises the optical coupling/splitting device according to claim 1 in the present invention, wherein the optical coupling/splitting means includes a slab waveguide for coupling the plurality of the up-signals in a multi-mode and splitting the down-signal in a single mode, a multi-mode optical fiber to which the up-signal that is output through the slab waveguide is input to be propagated in a multi-mode, and a plurality of single-mode optical fibers to which the down-signal that is output through the slab waveguide is input to be propagated in a single mode, wherein the slab waveguide includes an input port for input of the down-signal, and a filter portion that is disposed in the slab waveguide to be inclined by a predetermined angle to an optical axis of the multi-mode optical fiber such that the down-signal that is input through the input port is reflected thereon to be output to the plurality of the single mode optical fibers, and the up-signal is transmitted therein to be output to the multi-mode optical fiber.

An optical coupling/splitting device according to claim 14 in the present invention comprises the optical coupling/splitting device according to claim 1 in the present invention, wherein the optical coupling/splitting means includes a splitting element for splitting the down-signal, a plurality of single mode optical fibers for input/output of each of the plurality of the up-signals and the split down-signals, and a plurality of multi-mode converting/coupling elements to which the split down-signals are respectively input to be output to the plurality of the single mode optical fibers respectively for coupling the plurality of the up-signals, which are input through the plurality of the single mode optical fibers, in a multi-mode.

An optical coupling/splitting device according to claim 15 in the present invention comprises the optical coupling/splitting device according to claim 14 in the present invention, wherein the plurality of the multi-mode converting/coupling elements are formed of a directional coupler element a waveguide width of which is a non-equal width, the up-signal is subjected to mode conversion, which is thereafter output to a cross port of the multi-mode converting/coupling element, and the down-signal is output to a through port of the multi-mode converting/coupling element without the mode conversion.

An optical coupling/splitting device according to claim 16 in the present invention comprises the optical coupling/splitting device according to claim 14 or 15 in the present invention, wherein the splitting element is formed of an equal distribution optical splitter element for splitting the down-signal such that each optical intensity of the split down-signals becomes equal, the plurality of the multi-mode converting/coupling elements are in series connected through the multi-mode waveguide, and a down-signal input port of each of the plurality of the multi-mode converting/coupling elements in series connected is connected to the equal distribution optical splitter element.

An optical coupling/splitting device according to claim 17 in the present invention comprises the optical coupling/splitting device according to claim 16 in the present invention, wherein the plurality of the multi-mode converting/coupling elements are formed of N sets of the multi-mode converting/coupling elements in series connected, the optical coupling/splitting element further includes a multi-mode converting/coupling element of N inputs and one output that is connected through a multi-mode waveguide to each set of the N sets of the multi-mode converting/coupling elements in series connected, the up-signal that is subjected to multi-mode conversion and coupling in each set of the N sets of the multi-mode converting/coupling elements in series connected is subjected to multi-mode conversion and coupling in the multi-mode converting/coupling element of N inputs and one output.

An optical coupling/splitting device according to claim 18 in the present invention comprises the optical coupling/splitting device according to claim 16 or 17 in the present invention, further comprising a directional coupler element a waveguide width of which is a non-equal width for wavelength-multiplexing/demultiplexing the up-signal and the down-signal, wherein the directional coupler element of the equal width is in series connected to the plurality of the multi-mode converting/coupling elements through the multi-mode waveguide, and a down-signal input port of the directional coupler element of the equal width is connected to the equal distribution optical splitter element.

An optical coupling/splitting device according to claim 19 in the present invention comprises the optical coupling/splitting device according to claim 13 in the present invention, wherein the two-way optical propagation means includes the single mode optical fiber to which the down-signal is input to be output to the optical coupling/splitting means, and a multi-mode optical fiber to which the up-signal that is output from the optical coupling/splitting means is input.

A two-way optical propagation device according to claim 20 in the present invention includes a dual-mode optical fiber to which an up-signal is input to be propagated in a multi-mode for output, and which propagates a down-signal in a single mode for output, and a multiplexing/demultiplexing means for demultiplexing the up-signal that is output from the dual-mode optical fiber for output and multiplex the down-signals to be output to the dual-mode optical fiber.

A two-way optical propagation device according to claim 21 in the present invention comprises the two-way optical propagation device according to claim 20 in the present invention, wherein a single mode optical fiber for propagating the down-signal and a multi-mode optical fiber for propagating the up-signal are connected to the multiplexing/demultiplexing means.

An optical transmit-receive system according to claim 22 in the present invention comprises the two-way optical propagation device according to claim 21 in the present invention, wherein a transmitting portion that transmits the down-signal is connected to the single mode optical fiber, and a receiving portion that receives the up-signal is connected to the multi-mode optical fiber.

An optical transmit-receive system according to claim 23 in the present invention comprises the optical transmit-receiver system according to claim 22 in the present invention, wherein an optical amplifier for amplifying the down-signal is connected to the transmitting portion through the single mode optical fiber.

An optical transmit-receive system according to claim 24 in the present invention comprises the optical transmit-receive system according to claim 22 in the present invention, wherein the transmitting portion includes a plural-wavelength coupler that is connected to the single mode optical fiber, a plurality of second single mode optical fibers that are connected to the plural-wavelength coupler, and a plurality of transmitters that are respectively connected to the plurality of the second single mode optical fibers, wherein the plural-wavelength coupler to which the down-signals that are transmitted through the plurality of the second signal mode optical fibers from the plurality of the transmitters respectively are input, which multiplexes the input down-signals, and outputs the multiplexed down-signal to the single mode optical fiber.

An optical transmit-receive system according to claim 25 in the present invention comprises the optical transmit-receive system according to claim 22 or 24 in the present invention, wherein the receiving portion includes a plural-wavelength demultiplexer that is connected to the multi-mode optical fiber, a plurality of second multi-mode optical fibers that are connected to the plural-wavelength demultiplexer, and a plurality of receivers that are respectively connected to the plurality of the second multi-mode optical fibers, wherein the plural-wavelength demultiplexer, to which the up-signal is input from the multi-mode optical fiber, demultiplexes the input up-signal, and outputs the demultiplexed up-signals through the plurality of the second multi-mode optical fibers to the plurality of the receivers respectively.

An optical transmit-receive system according to claim 26 in the present invention comprises an optical transmit-receive system including the two-way optical propagation device according to claim 20 in the present invention, a transmitter that transmits the down-signal, and a receiver that receives the up-signal, wherein the two-way optical propagation device further includes a space lens system, wherein the up-signal that is output from the dual mode optical fiber is connected through the multiplexing/demultiplexing means and the space lens system to the receiver in a multi-mode, and the down-signal that is transmitted from the transmitter is connected through the multiplexing/demultiplexing means and the space lens system to the dual mode optical fiber in a single mode.

An optical transmit-receive system according to claim 27 in the present invention comprises the optical transmit-receive system according to claim 26 in the present invention, wherein the transmitter incorporates therein an optical amplifier for amplifying the down-signal.

Advantageous Effects of Invention

According to the present invention, the splitting of the down-signal and the coupling of the up-signals are realized by the same optical device, and the coupling loss of the up-signals is reduced, thereby making it possible to obtain an effect similar to that in a case of increasing the loss budget equivalently by the reduced loss amount.

BRIEF DESCRIPTION OF DRAWINGS

FIG. 17A is a diagram showing an example of a multi-mode converting/coupling element formed of a directional coupler element of a non-equal width used in the optical coupling/splitting device according to the embodiment 8 of the present invention;

FIG. 17B is a diagram showing an example of a multi-mode converting/coupling element formed of a directional coupler element of a non-equal width used in the optical coupling/splitting device according to the embodiment 8 of the present invention;

FIG. 17C is a diagram showing an example of a multi-mode converting/coupling element formed of a directional coupler element of a non-equal width used in the optical coupling/splitting device according to the embodiment 8 of the present invention;

FIG. 20A is a diagram showing the configuration of a multi-mode coupling element of two inputs and one output used in the optical coupling/splitting device according to the embodiment 9 of the present invention;

FIG. 20B is a diagram showing the configuration of a multi-mode coupling element of two inputs and one output used in the optical coupling/splitting device according to the embodiment 9 of the present invention;

DESCRIPTION OF EMBODIMENTS

Embodiment 1

Figure 2B:
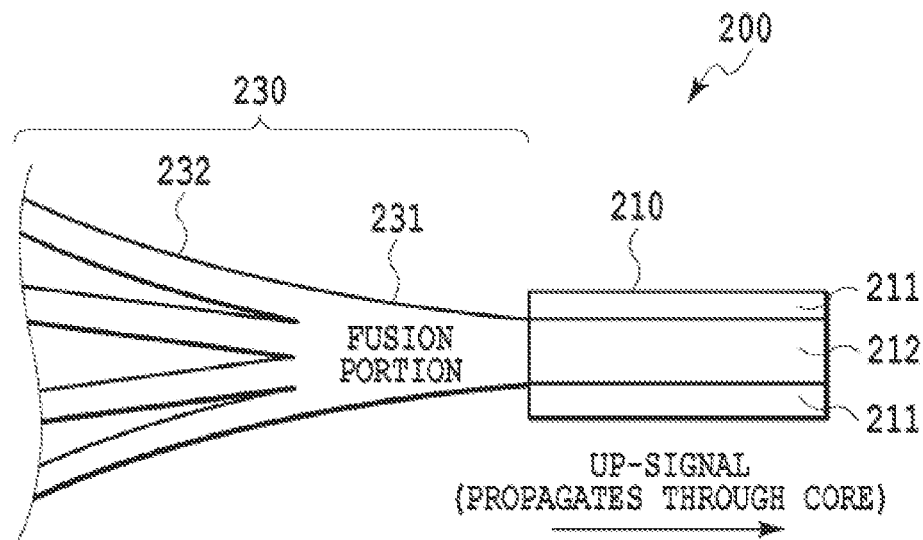
FIG. 2B is a diagram showing an optical coupling device by the conventional technology.
Figure 3:
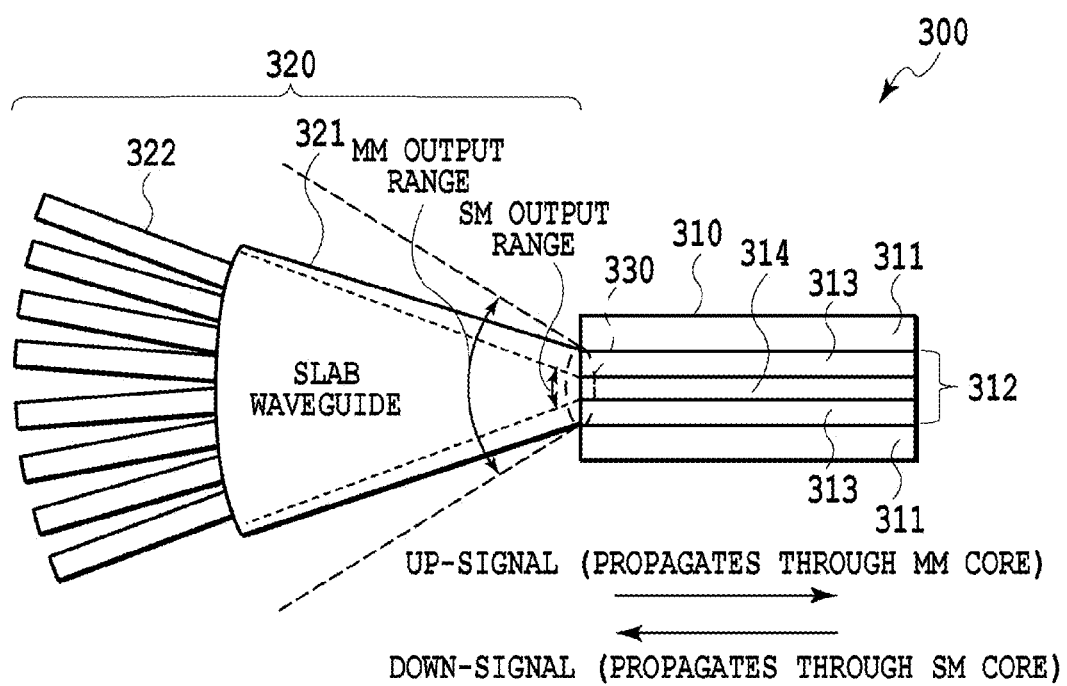
FIG. 3 is a diagram showing an optical coupling/splitting device according to an embodiment 1 of the present invention.

FIG. 3 shows an optical coupling/splitting device 300 according to an embodiment 1 in the present invention. FIG. 3 shows the optical coupling/splitting device 300 that is provided with a dual mode fiber (DMF) 310 and a PLC 320 that is connected to the DMF 310. The DMF 310 is provided with multi-mode (MM) clads 311 and an MM core 312, and the MM core 312 is provided with single mode (SM) clads 313 and an SM core 314. The PLC 320 is provided with a slab waveguide 321 and SM waveguides 322 that are connected to the slab waveguide 321. It should be noted that FIG. 3 exemplifies a case of using the PLC, but a fusion SMF waveguide shown in FIG. 2B may be used.

The DMF 310 is an optical fiber that can be used for both of SM transmission and MM transmission. In the DMF 310, the SM clads 313 and SM core 314 for SM transmission form the MM core 312 for MM transmission, and the MM clads 311 for MM transmission are formed outside of the MM core 312.

Figure 4A:
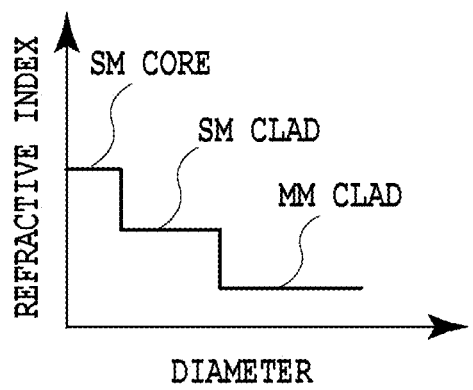
FIG. 4A is a diagram showing a relation between a radius and a reflection rate distribution of a dual mode fiber (DMF)
Figure 4B:
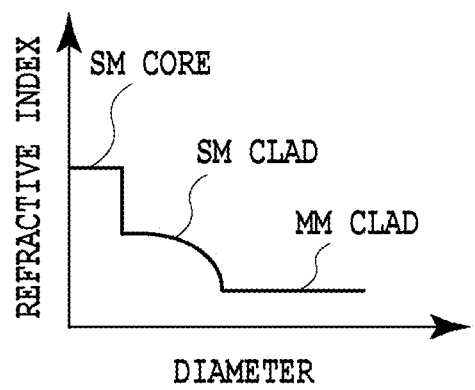
FIG. 4B is a diagram showing a relation between a radius and a reflection rate distribution of the DMF.

FIG. 4A and FIG. 4B each show a relation between a radius and a refractive index distribution of the DMF 310. As shown in FIG. 4A, the refractive index distribution of the DMF 310 is formed to gradually increase in the order of the SM core 314, the SM clad 313, and the MM clad 311. In addition, as shown in FIG. 4B, the refractive index distribution of the DMF 310 may be formed such that the refractive index of the SM clad 313 successively changes. As shown in FIG. 4B, when the refractive index of the SM clad 313 successively changes, it has an advantage that an influence by mode dispersion at MM transmission can be largely reduced as compared to the refractive index distribution of the DMF 310 shown in FIG. 4A.

The respective up-signals that are incident to the SM waveguides 322 of the PLC 320 are coupled in the slab waveguide 321, to be confined in the MM core 312 of the DMF 310 to be transmitted. On the other hand, the down-signal that is incident to the SM core 314 of the DMF 310 is output from the SM core 314 in a predetermined angle at the connecting point between the DMF 310 and the slab waveguide 321, and is split into optical signals each having equal optical intensity, which are connected to the respective waveguides 322 without a leakage.

Figure 2A:
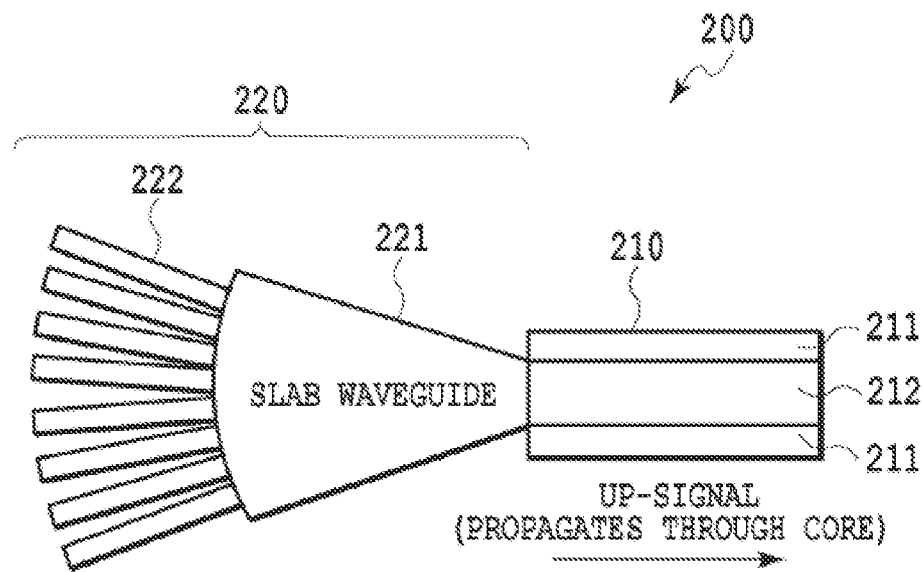
FIG. 2A is a diagram showing an optical coupling device by the conventional technology.

In a case where the down-signal is incident to the MMF 210 of the optical coupling device 200 exemplified in FIG. 2A, since the down-signal is output from the MMF 210, as an MM output range is exemplified in FIG. 3a range of the output angle of the down-signal in the connecting point between the MMF 210 and the slab waveguide 222 is large. Therefore, since a large part of the down-signal is leaked without being connected to the respective SM waveguides 322, a remarkable large loss occurs.

By using the DMF 310, however, this loss can be close to zero in principle. That is, the optical coupling/splitting device 300 according to the embodiment 1 in the present invention, in a case of being used in a two-way as in the case of transmission and reception of the optical signal, acts as an optical coupling device (mode coupler) of an extremely low loss to the up-signal, and acts as a regular optical splitting device having a principled coupling loss of N/1 to the down-signal. When the optical coupling/splitting device 300 according to the embodiment 1 in the present invention is applied to the configuration of the PON system, the optical splitting device and the optical coupling device can be united as a single kind to realize reduction in the number of components and reduction in costs of the system.

Embodiment 2

Figure 5:
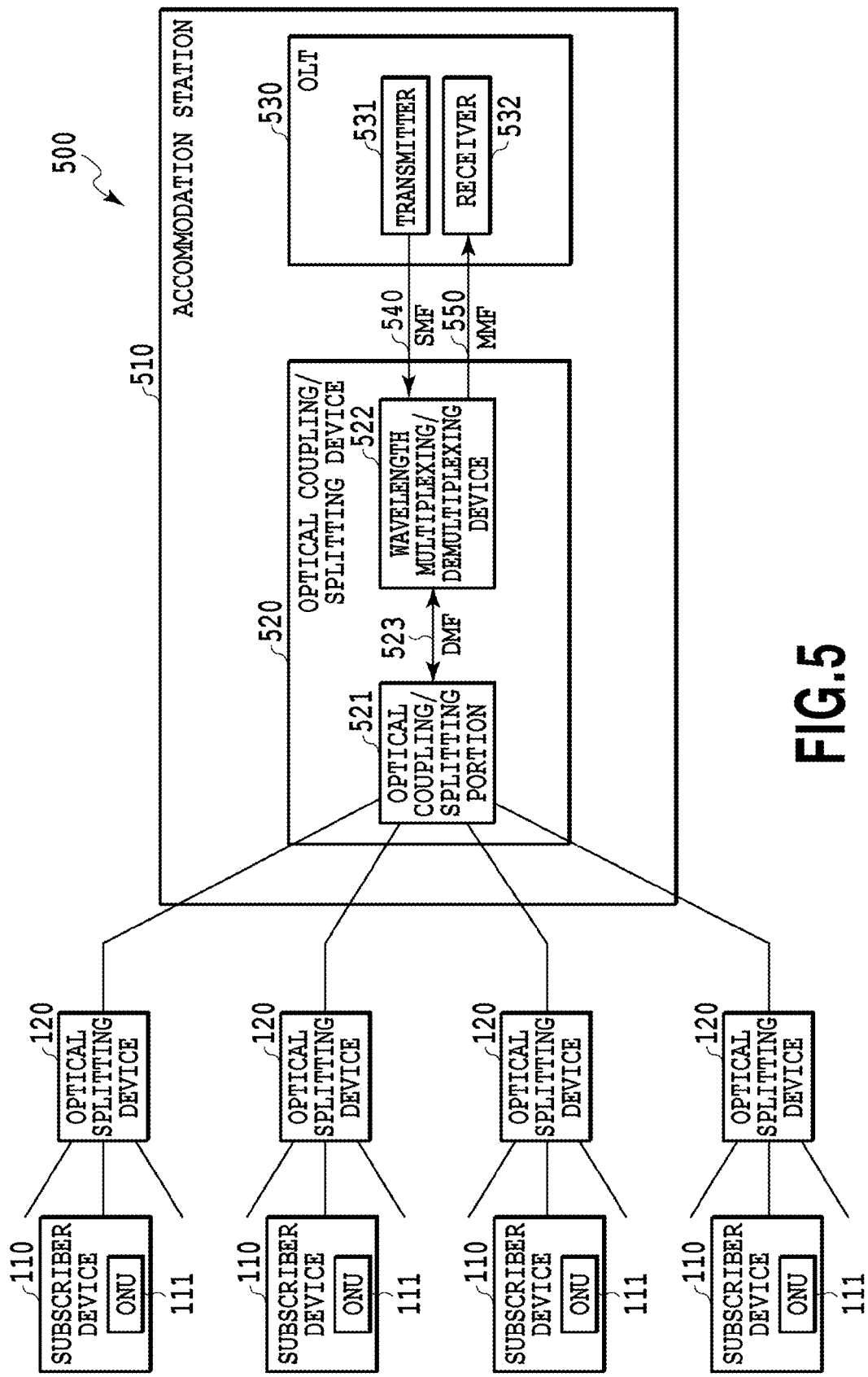
FIG. 5 is a diagram showing a system using an optical coupling/splitting device according to an embodiment 2 of the present invention.

FIG. 5 shows a system 500 using an optical coupling/splitting device 520 according to an embodiment 2 in the present invention. FIG. 5 shows the system 500 that includes subscriber devices 110, optical splitting device 120, and an accommodation station 510, wherein the accommodation station 510 is provided with an optical coupling/splitting device 520, and an OLT 530 that includes a transmitter 531 and a receiver 532.

The optical coupling/splitting device 520 shown in FIG. 5 has the configuration of connecting an optical coupling/splitting portion 521 formed of the optical coupling/splitting device 300 according to the embodiment 1 and a wavelength multiplexing/demultiplexing device 522 for multiplexing/demultiplexing up and down-signals through a DMF 523. As shown in FIG. 5, the wavelength multiplexing/demultiplexing device 522 and the transmitter 531 are connected through an SMF 540, and the wavelength multiplexing/demultiplexing device 522 and the receiver 532 are connected through a MMF 550. The wavelength multiplexing/demultiplexing device 522 can be made as a WDM optical filter that splits an up-signal and couples down-signals, for example.

Figure 1:
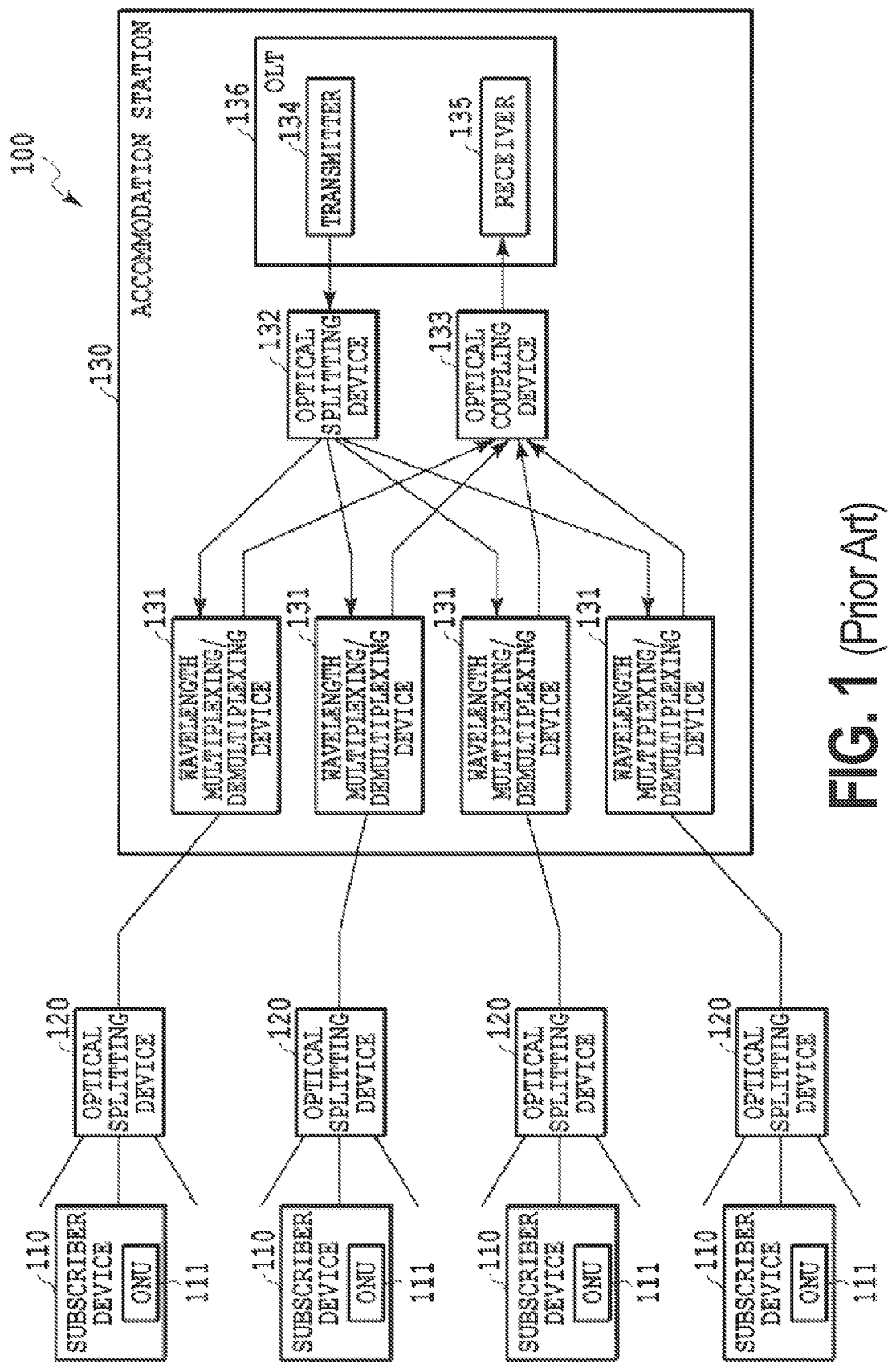
FIG. 1 is a configuration diagram showing a PON system that is formed by combining a plurality of optical devices by the conventional technology.

When the optical coupling/splitting portion 521 formed of the optical coupling/splitting device 300 according to the embodiment 1 is applied to the PON system, as compared to the conventional PON system shown in FIG. 1 the number of the wavelength multiplexing/demultiplexing devices in use can be largely reduced to largely simplify the configuration in the accommodation station.

It should be noted that in a case where a transmission path allowance loss of the down-signal is lower than that of the up-signal, an optical amplifier (not shown) is disposed in an output side of the transmitter 531 to increase transmission optical intensity of the optical signal that is output from the transmitter 531. In this way, the losses may be balanced therebetween. It is desirable that the transmitter 531 and the receiver 532 are united with a module of a small form factor pluggable (SFP), a 10 gigabit small form factor pluggable (XFP) or the like as an optical transceiver. As needed, an optical amplifier that amplifies a down-signal may be incorporated in the module. In a case of FIG. 5, since input and output routes of the module are different, the transmitter 531 and the receiver 532 are formed as a two-core optical transceiver. In addition, in the present embodiment, the wavelength multiplexing/demultiplexing device 522 is formed of the WDM optical filter, but the similar effect can be obtained also in a case of using an optical circulator.

Figure 6:
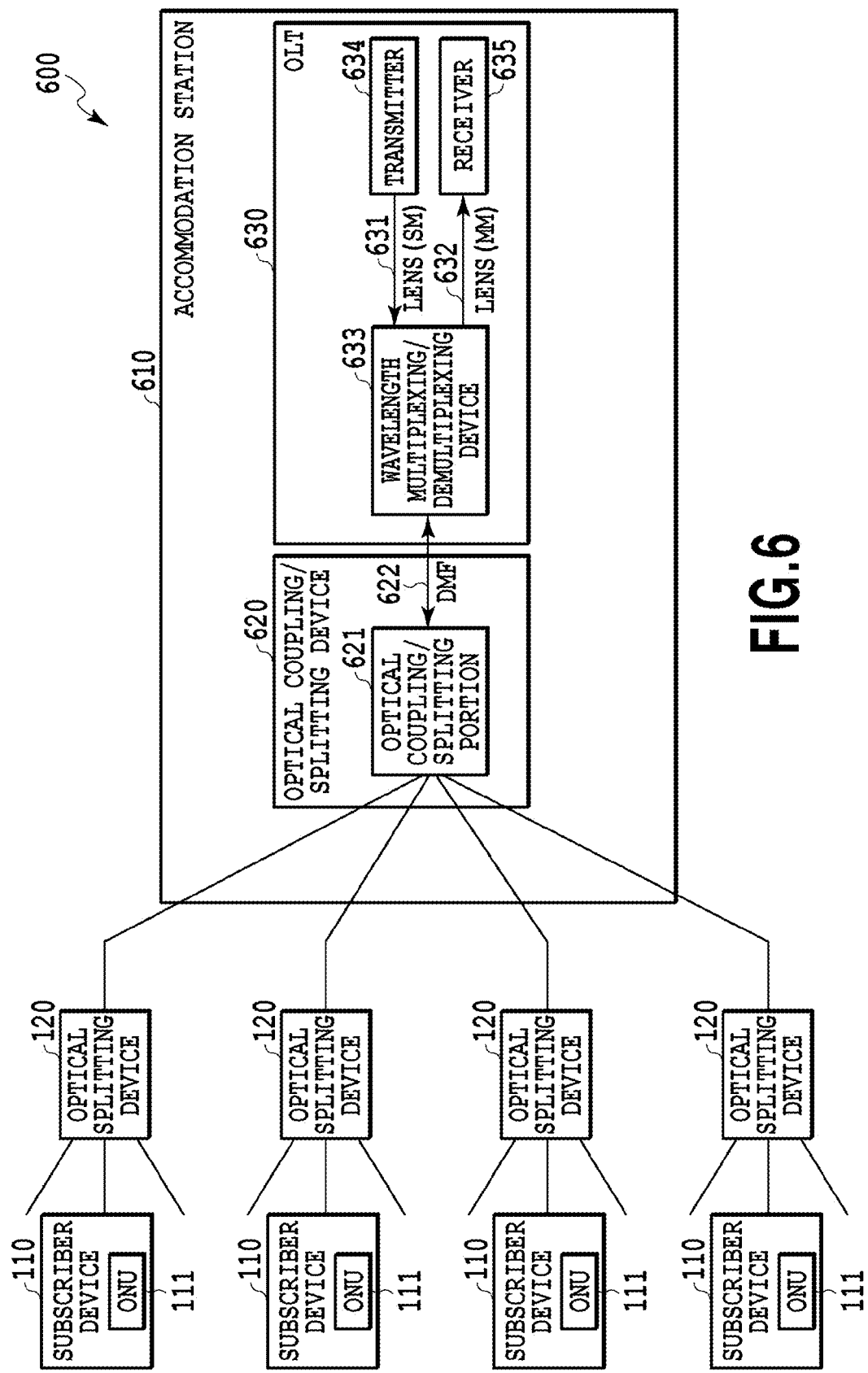
FIG. 6 is a diagram showing another aspect of the system using the optical coupling/splitting device according to the embodiment 2 of the present invention.

FIG. 6 shows another aspect of the system using the optical coupling/splitting device 520 according to the embodiment 2 in the present invention. FIG. 6 shows a system 600 that includes the subscriber devices 110, the optical splitting devices 120, and an accommodation station 610, wherein the accommodation station 610 is provided with an optical coupling/splitting device 620 and an OLT 630.

The optical coupling/splitting device 620 shown in FIG. 6 uses an optical coupling/splitting device 621 formed of the optical coupling/splitting device 300 according to the embodiment 1. The OLT 630 includes a wavelength multiplexing/demultiplexing device 633 that is connected to the optical coupling/splitting device 621 through a DMF 622, a transmitter 634 that is connected through a space lens system 631 to the wavelength multiplexing/demultiplexing device 633 in an SM, and a receiver 635 that is connected through a space lens system 632 to the wavelength multiplexing/demultiplexing device 633 in an MM.

As shown in FIG. 6, the wavelength multiplexing/demultiplexing device 633 such as the WDM optical filter, the optical circulator or the like is incorporated in the OLT 630, and is connected to the transmitter 634 and the receiver 635 using the space lens systems 631 and 632 respectively, thereby making it possible to configure an optical transceiver module. A down-signal of the PON that passes through the space lens system 631 is propagated in the SM, and an up-signal of the PON that passes through the space lens system 632 is propagated in the MM.

In a case of the system 600 shown in FIG. 6, since the input and output routes of the module are the same route, the transmitter 634 and the receiver 635 are formed as a one-core optical transceiver. By thus forming the transmitter and the receiver as the optical transceiver module, the optical transmit-receive system can be downsized and sized to be small in space, and further has an advantage that the module replacement at a failure can be easily made.

Embodiment 3

Figure 7:
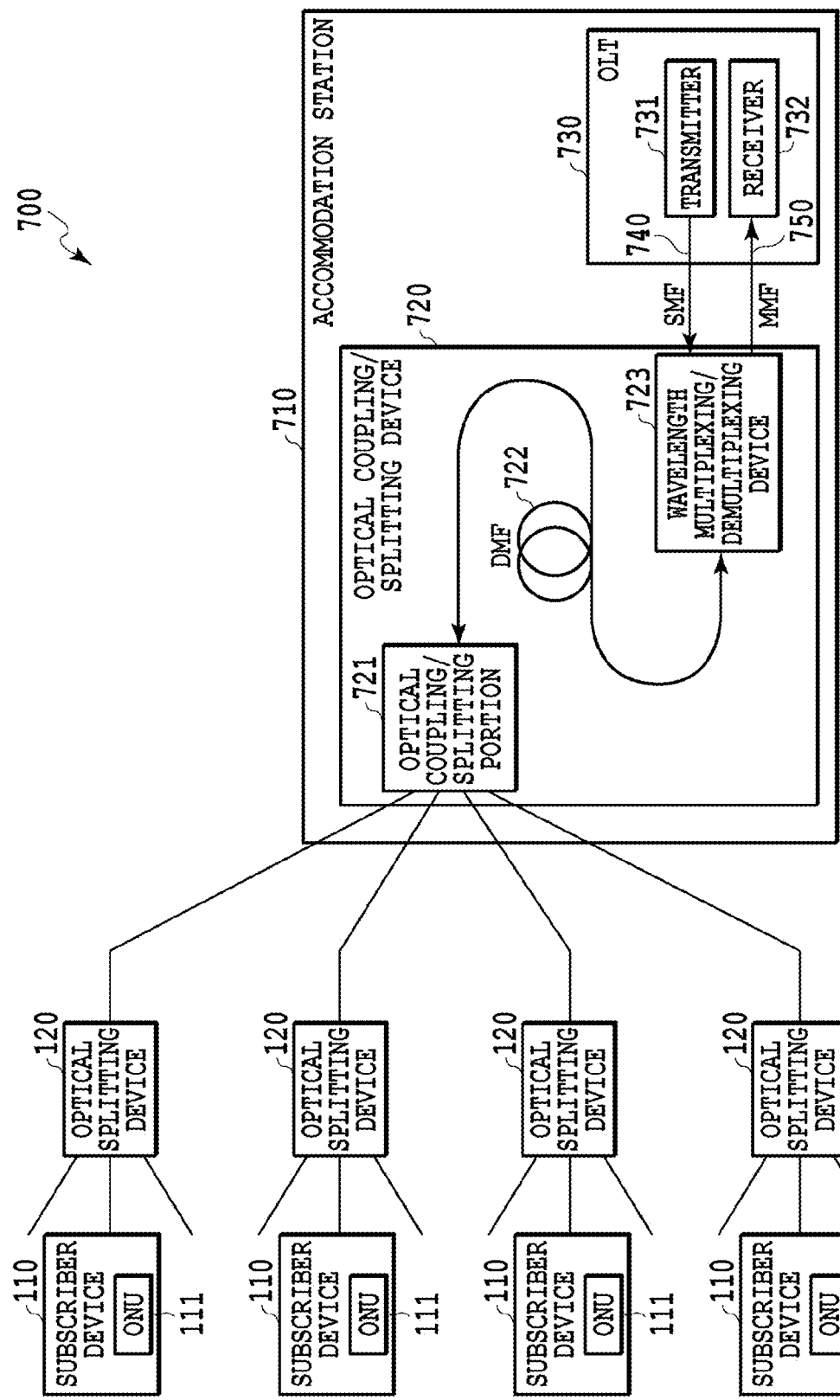
FIG. 7 is a diagram showing an optical transmit-receive system according to an embodiment 3 of the present invention.

FIG. 7 shows an optical transmit-receive system 700 according to an embodiment 3 in the present invention. FIG. 7 shows the system 700 that includes the subscriber devices 110, the optical splitting devices 120, and an accommodation station 710, wherein the accommodation station 710 is provided with an optical coupling/splitting device 720, and an OLT 730 that includes a transmitter 731 and a receiver 732. The optical coupling/splitting device 720 includes an optical coupling/splitting portion 721 formed of the optical coupling/splitting device 300 according to the embodiment 1, and a wavelength multiplexing/demultiplexing device 723 that is connected to the optical coupling/splitting portion 721 through a DMF 722.

Figure 8:
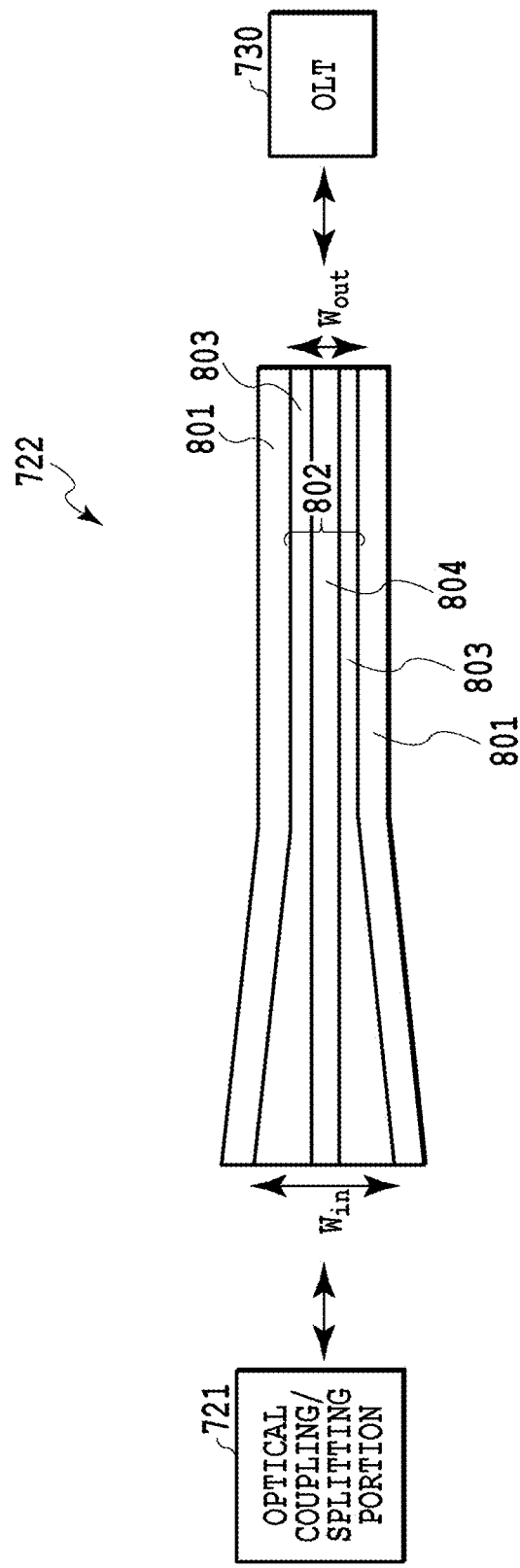
FIG. 8 is an enlarged diagram showing an optical coupling/splitting device in the optical transmit-receive system according to the embodiment 3 of the present invention.

In the optical coupling/splitting device 720, the DMF 722 is configured such that a diameter of an SM clad is reduced in a tapered shape in direction from the optical coupling/splitting portion 721 to the wavelength multiplexing/demultiplexing device 723. FIG. 8 is an enlarged diagram of the DMF 722 in the optical coupling/splitting device 720 in the optical transmit-receive system. 700 according to the embodiment 3 of the present invention. FIG. 8 shows the DMF 722 that includes MM clads 801, and an MM core 802 including SM clads 803 and an SM core 804.

As shown in FIG. 8, the DMF 722 is configured such that a waveguide width$_{in}$ of the DMF 722 in a side of the optical coupling/splitting portion 721 is larger than a waveguide width$_{out}$ of the DMF 722 in a side of the OLT 730, and the waveguide width is gradually narrowed from the optical coupling/splitting portion 721 to the OLT 703. An inclination of the taper for converting a high-order mode to a low-order mode without the loss is approximately determined from a difference between an average refractive index of the MM core 802 and a refractive index of the MM clad 801.

In this manner, when the inclination of the taper is gradually formed in the longitudinal direction of the DMF 722, the width of the MM core 802 is narrowed. Thereby, since the allowable high-order mode is reduced, the high-order mode is converted into the low-order mode. Consequently, an optical signal of the high-order that propagates through the MM core 802 is converted into the low-order mode without the loss. Thereby the influence of the mode dispersion in the MM transmission can be reduced to expand a transmission distance of the up-signal.

When the optical coupling/splitting device 700 according to the embodiment 3 is applied to the PON system in FIG. 1, it is possible to separate the installation position of the optical coupling/splitting portion from the installation position of the transmitting/receiving device, which contributes to an improvement on a degree of freedom of the device arrangement in the accommodation station. There is herein shown a case where the optical coupling/splitting device 700 according to the embodiment 3 is applied to the embodiment 2, but the similar effect can be obtained even in a case of being applied to the embodiment 1.

Embodiment 4

Figure 9:
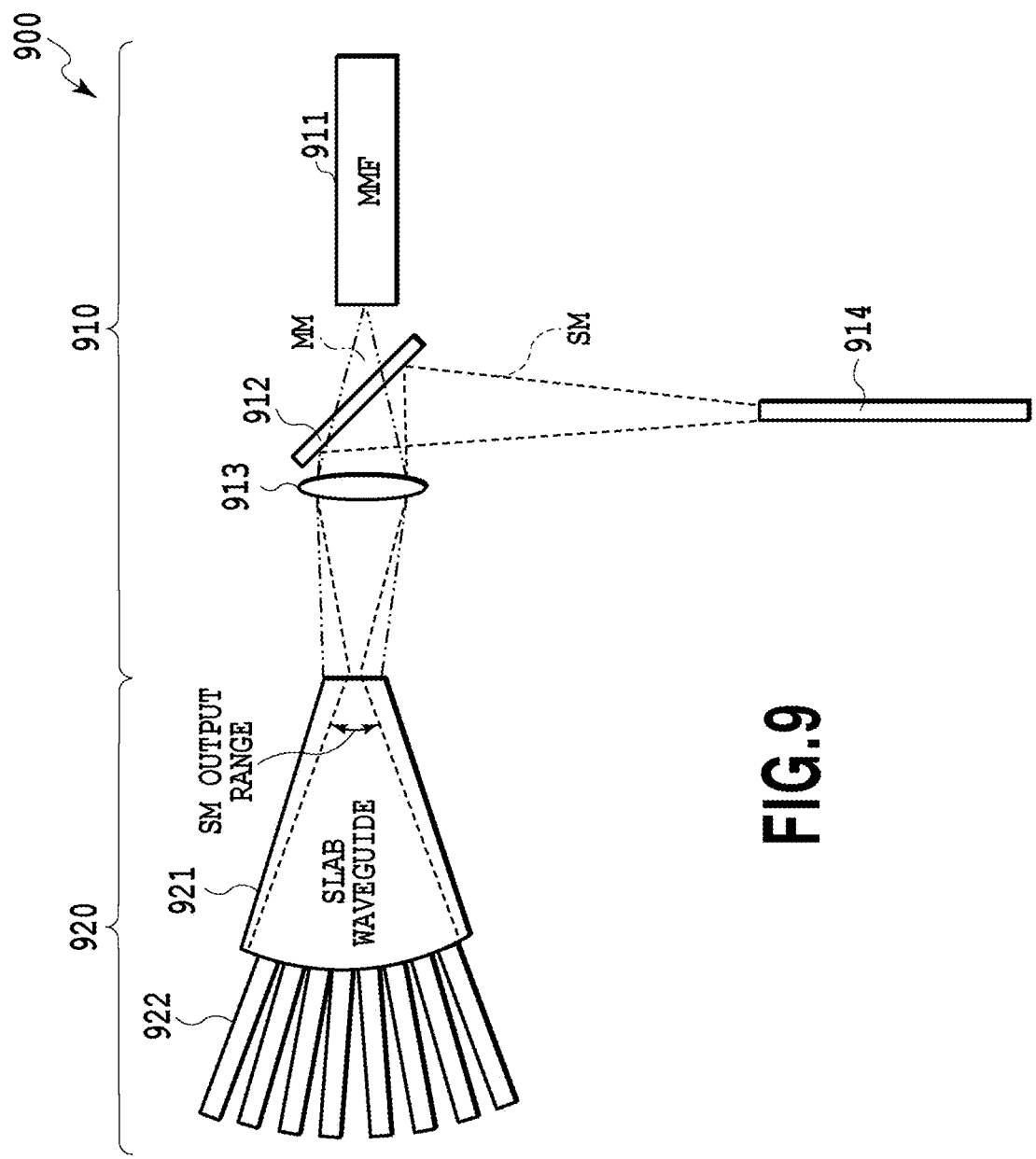
FIG. 9 is a diagram showing an optical coupling/splitting device according to an embodiment 4 of the present invention.

FIG. 9 shows an optical coupling/splitting device 900 according to an embodiment 4 in the present invention. FIG. 9 shows the optical coupling/splitting device 900 that includes an optical coupling/splitting portion 910, and a PLC 920. The optical coupling/splitting portion 910 includes an MMF 911, a wavelength multiplexing/demultiplexing device 912, a space lens system 913, and an SMF 914. The PLC 920 includes a slab waveguide 921 and SM waveguides 922 connected to the slab waveguide 921. It should be noted that in FIG. 9, there is exemplified a case of using the PLC, but the fusion SMF waveguide shown in FIG. 2B may be used. The wavelength multiplexing/demultiplexing device 912 that multiplexes/demultiplexes the up-signal and the down-signal can be formed of a WDM filter or an optical circulator.

The optical coupling/splitting device 900 according to the embodiment 4 in the present invention is configured using the wavelength multiplexing/demultiplexing device 912 and the space lens system 913 instead of the DMF 310 in the optical coupling/splitting device 300 according to the embodiment 1. Up-signals that are incident to the SM waveguides 922 from the subscriber devices are coupled in an NM in the slab waveguide 921, which transmits the space lens system 913, and is split in the wavelength multiplexing/demultiplexing device 912, which are connected in the core of the MMF 911. The optical signal may be connected directly to the receiver without using the MMF 911.

On the other hand, down-signals that are incident to the SMF 914 are multiplexed and reflected by the wavelength multiplexing/demultiplexing device 912, which transmits the space lens system 913, is propagated in the SM, and is incident to the slab waveguide 921. Consequently an optical beam profile of an output end of the SMF 914 is connected to an input end of the slab waveguide 921. The down-signal that is incident to the slab waveguide 921, as similar to a case of using the DMF, is split into optical signals each having an equivalent optical intensity in the slab waveguide 921, which are respectively connected to each of the SM waveguides 922. The transmitter output may be connected directly to the lens without using the SMF 914.

By applying the optical coupling/splitting device 900 according to the embodiment 4 in the present invention to the PON system, the numbers of the wavelength multiplexing/demultiplexing devices in use can be largely reduced to largely simplify the configuration in the accommodation station.

It should be noted that, though not illustrated, the two-core transceiver module shown in the embodiment 3 may be used to the receiver and the transmitter that are connected to the MMF and the SMF. On the other hand, in a case of lens-connecting the signal light directly to the receiver and the transmitter without using the MMF and the SMF, an entire optical transmit-receive system formed of the optical coupling/splitting device 900 according to the embodiment 4, the transmitter and the receiver can be downsized and sized to be small in space. The entirety of the present system is united to a module of a quad small form factor pluggable (QSFP) or the like, so that the system can be furthermore downsized and sized to be smaller in space.

Embodiment 5

In the optical coupling/splitting device according to each of the embodiments 1 to 4, the slab waveguide as shown in FIG. 3 is used, but there is a problem that in a splitter circuit using the slab waveguide, a loss of a center port is small, and the loss tends to more easily increase as closer to an end port. Therefore, there are executed various methods, for example, variations between ports are restricted by changing the waveguide width for each port in the connection points between the slab waveguide and the respective input and output waveguides or by making the slab length longer to sacrifice an increase of an average loss.

In addition, In the optical coupling/splitting device according to each of the embodiments 1 to 4, the DMF is used, but optical characteristics of the DMF at SM transmission are determined by the configuration and refractive index of each of the SM clad and the SM core, and optical characteristics of the DMF at MM transmission are determined by the configuration and refractive index of each of the MM clad and the MM core. For example, when the refractive indexes of the SM clad and the SM core are respectively set to $N_{0,SM}$ and $n_{1,SM}$, an opening angle $NA_{MM}$ as the maximum light receiving angle $\theta_{max,NM}$ that the SM core can receive is expressed as follows.

[Formula 1]

$$NA_{SM} = \theta_{max,SM} \approx \sqrt{n_{1,SM}^2 - n_{0,SM}^2} \qquad \text{Formula (1)}$$

In addition, when the refractive indexes of the MM clad and the MM core are respectively set to $N_{0,MM}$ and $n_{1,MM}$, an opening angle $NA_{MM}$ as the maximum light receiving angle $\theta_{max,MM}$ that the MM core can receive is expressed as follows.

[Formula 2]

$$NA_{MM} = \theta_{max,MM} \approx \sqrt{n_{1,MM}^2 - n_{0,MM}^2} \qquad \text{Formula (2)}$$

However, in a case of using the DMF to configure an optical coupling/splitting device, since a core diameter and an opening angle of an SM portion formed of the SM clad and the SM core in the DMF are different from a core diameter and an opening angle of an MM portion formed of the MM clad and the MM core in the DMF, it is difficult to design a splitting loss variation of the down-signal, a coupling loss variation of the up-signal, and an average excessive loss of the optical splitting/coupling device to low values simultaneously.

In addition, for operating the optical splitting/coupling device as the splitting circuit, it is necessary that a waveguide gap g determined by process accuracy or the like is set within a range of the opening angle $NA_{SM}$ of the optical signal that is output from the SM portion in the DMF to line up SM waveguides each having a waveguide width w. Therefore, a slab length L of the optical splitting/coupling device the input/output port number of which is N is required to be set longer than a value $L_1$ determined by the following formula (3).

[Formula 3]

$$L_1 = \frac{N \cdot w + (N-1) \cdot g}{2 \cdot NA_{SM}} \qquad \text{Formula (3)}$$

On the other hand, for operating the optical splitting/coupling device as the coupling circuit without excessive losses, it is necessary that a spot size of an up-signal that has propagated in the slab waveguide is smaller than a core diameter 2a of the MM portion of the DMF. Therefore, when an opening angle of the SM waveguide is indicated at $NA_{SMWG}$, a slab length L is required to be set shorter than a value $L_2$ determined by the following formula (4).

[Formula 4]

$$L_2 = \frac{2 \cdot a}{2 \cdot NA_{SMwg}}$$

Formula (4)

As described above, the slab length L is required to meet a relation of $L_1 \leq L \leq L_2$. As shown in Formula (3) and Formula (4), $L_1$ and $L_2$ are values depending on a parameter of a waveguide in use.

However, in a case of using a silica embedding waveguide that reduces a connecting loss to the optical fiber to be small, when the input/output port number N is set to 8 or more, $L_1$ is larger than $L_2$. Therefore the optical splitting/coupling device cannot act as the splitting circuit, and cannot operate as a coupling circuit without the excessive loss, either. That is, in the optical splitting/coupling device of the structure in which an output spot of the signal light that propagates in the slab waveguide is determined by an opening angle of an optical fiber or an optical waveguide used for incidence of a signal light and a slab length of a slab waveguide, there is a problem that as the number of ports is increased, a coupling loss of the device cannot be made small.

As explained above, regardless of the system is configured to lower the coupling loss, there is a problem that the coupling loss and the loss variation of the optical splitting/coupling device itself cannot be made small.

Figure 10A:
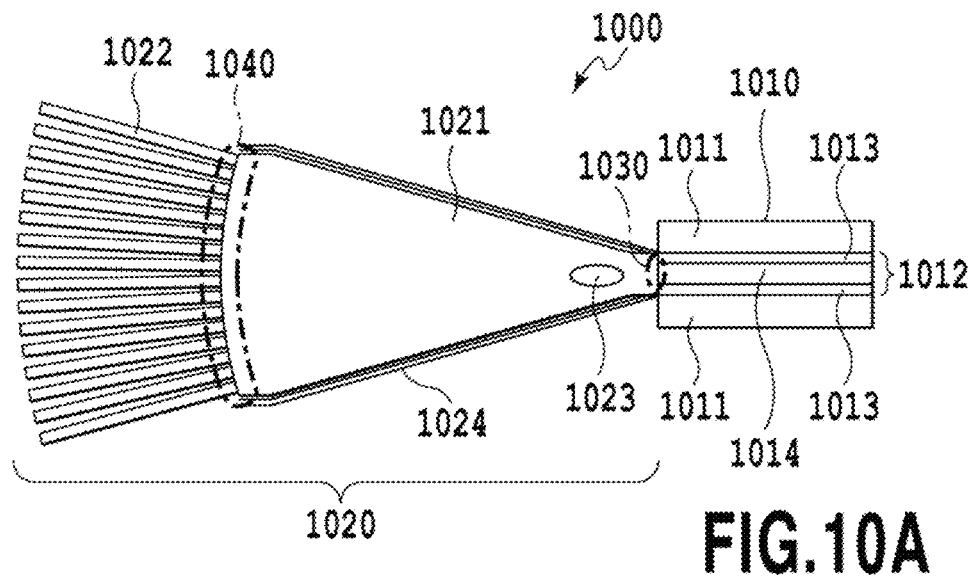
FIG. 10A is a diagram showing an optical coupling/splitting device according to an embodiment 5 of the present invention.
Figure 10B:
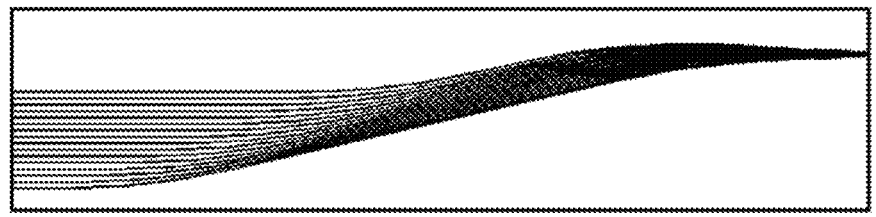
FIG. 10B is a diagram showing the optical coupling/splitting device according to the embodiment 5 of the present invention.
Figure 10C:
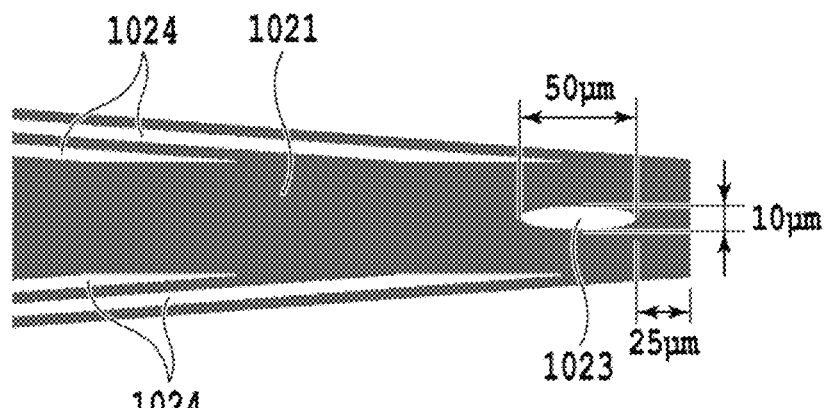
FIG. 10C is a diagram showing the optical coupling/splitting device according to the embodiment 5 of the present invention.

FIG. 10A to FIG. 10C show an optical coupling/splitting device 1000 according to the embodiment 5 in the present invention. FIG. 10A shows the configuration of the optical coupling/splitting device 1000 according to the embodiment 5 in the present invention. FIG. 10A shows the optical coupling/splitting device 1000 that is provided with a DMF 1010 and optical waveguides 1020. The DMF 1010 is provided with MM clads 1011 and an MM core 1012, wherein the MM core 1012 is provided with SM clads 1013 and an SM core 1014. The optical waveguide 1020 is provided with a slab waveguide 1021 that is connected to the DMF 1010 and SM waveguides 1022 that are connected to the slab waveguide 1021. As shown in FIG. 10A, the slab waveguide 1021 includes an elliptical core lacking portion 1023 that is disposed on an extension line of an optical axis of the DMF 1010, and a refractive index intensifying structure 1024 for intensifying a refractive index that is disposed in a boundary not abutting on the DMF 1010 or the SM waveguide 1022 among boundaries of the slab waveguide 1021.

As the DMF 1010 is used the optical fiber in which a relative refractive index difference of the MM portion is 0.6% and a core long diameter thereof is a diameter of 50 μm, and a relative refractive index difference additional amount of the SM portion is 0.3% and a core short diameter thereof is a diameter of 10 μm. The optical waveguide 1020, which is configured of the slab waveguide 1021 and the SM waveguides 1022, adopts a planar lightwave circuit that is formed by performing a waveguide process to a silica-based glass film produced on a silicon substrate by a flame deposition method, by reactive ion etching.

The coupling/splitting number of the optical coupling/splitting device 1000 according to the embodiment 5 in the present invention is 16 ports, wherein a relative refractive index difference of the optical waveguide 1020 is 0.3%, a waveguide width of the SM waveguide 1022 is 7 μm, and an entire length of the slab waveguide 1021 is 1150 μm. The core lacking portion 1023 is configured to have an elliptical configuration that is line-symmetrical around the extension line of the optical axis of the DMF 1010 such that a long diameter is 50 μm in the entire width, and a short diameter is 10 μm in the entire width. The refractive index intensifying structure 1024 that is disposed in the boundary to the slab waveguide 1022 has the structure that a linear core area having a gap width of 5.2 μm and a line width of 5.2 μm is arranged in two lines. Therefore optical components of the up-signal that is emitted outside of the slab waveguide 1021 can be reflected to be confined in the slab waveguide 1021.

FIG. 10B is a layout diagram expressing an entire state of a chip that is produced using the optical coupling/splitting device 1000 according to the embodiment 5, wherein a chip size thereof is 4 mm×17 mm. In addition, for preventing ortho-facing of the SMF and the DMF that are connected to the chip, the chip is designed such that the SM waveguide is arranged in an S-letter shape to set an offset amount between an optical axis of the SMF and that of the DMF to 750 μm at the minimum. This arrangement is to prevent slightly leaked light generating at the time the signal light is incident to the chip from propagating through a clad layer of the optical waveguide and entering into the output fiber once more. This is because when the uncontrolled leaked light enters into the output fiber, the output intensity of the signal light varies due to interference, and the loss variation can be restricted by implementing the measure on the leaked light.

FIG. 10C is an enlarged diagram of the periphery of the core lacking portion 1023 on the slab waveguide 102 and the close vicinity of the connecting portion between the DMF 1010 and the slab waveguide 1021 in the optical coupling/splitting device 1000 according to the embodiment 5 in the present invention. The optical coupling/splitting device 1000 according to the embodiment 5 is designed such that a distance from an end surface of the DMF 1031 to a right end of the elliptical core lacking portion 1023 is set to 25 μm, and the refractive index intensifying structure 1024 of two lines disappears in the vicinity of the connecting portion to the DMF 1010. Further, since the variation of the splitting loss depends greatly on the setting of the waveguide width, the waveguide width is set in the order of 7.7 μm, 7.5 μm, 8.7 μm, 11.1 μm, 7.1 μm, 6.7 μm, 6.25 μm, 6.25 μm, 6.7 μm, 7.1 μm, 11.1 μm, 8.7 μm, 7.5 μm, and 7.7 μm from the end, for reducing the variation of the splitting loss to be small.

It should be noted that in the embodiment 5, the orientation of the waveguide in the connecting portion 1040 between the slab waveguide 1021 and the SM waveguide 1022 is not adjusted. That is, any optical axis of the SM waveguides 1022 is directed to the connecting point 1030 between the slab waveguide 1021 and the DMF 1010.

Figure 11A:
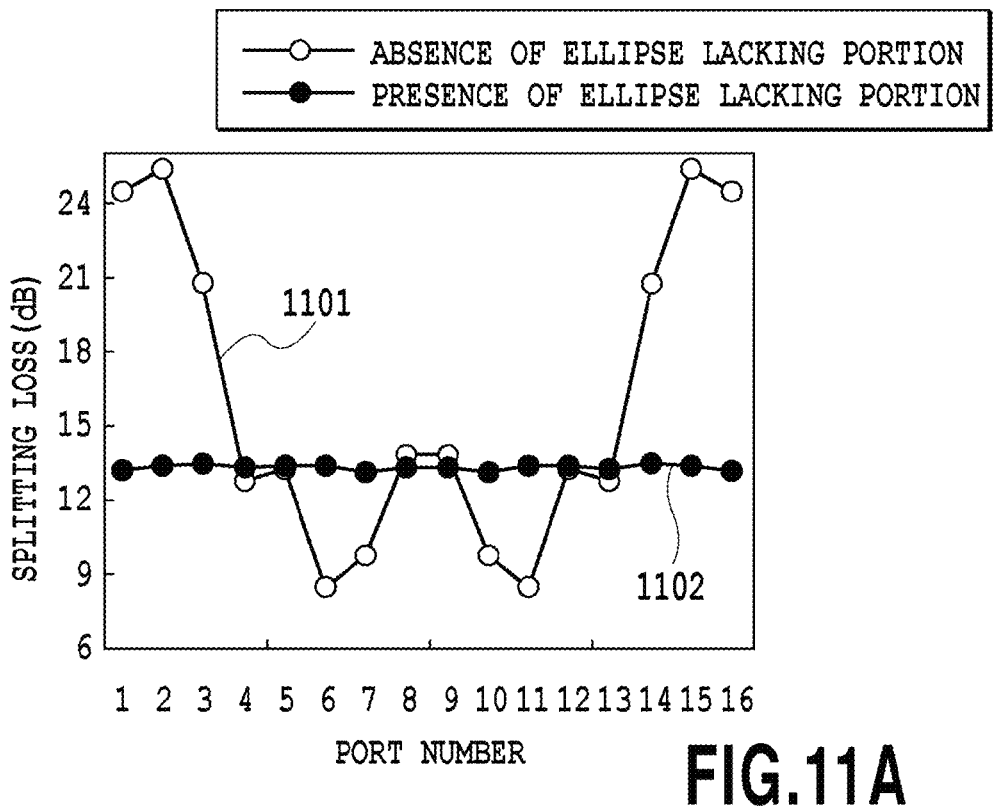
FIG. 11A is a diagram showing the result of measuring a splitting loss of the optical coupling/splitting device according to the embodiment 5 of the present invention.
Figure 11B:
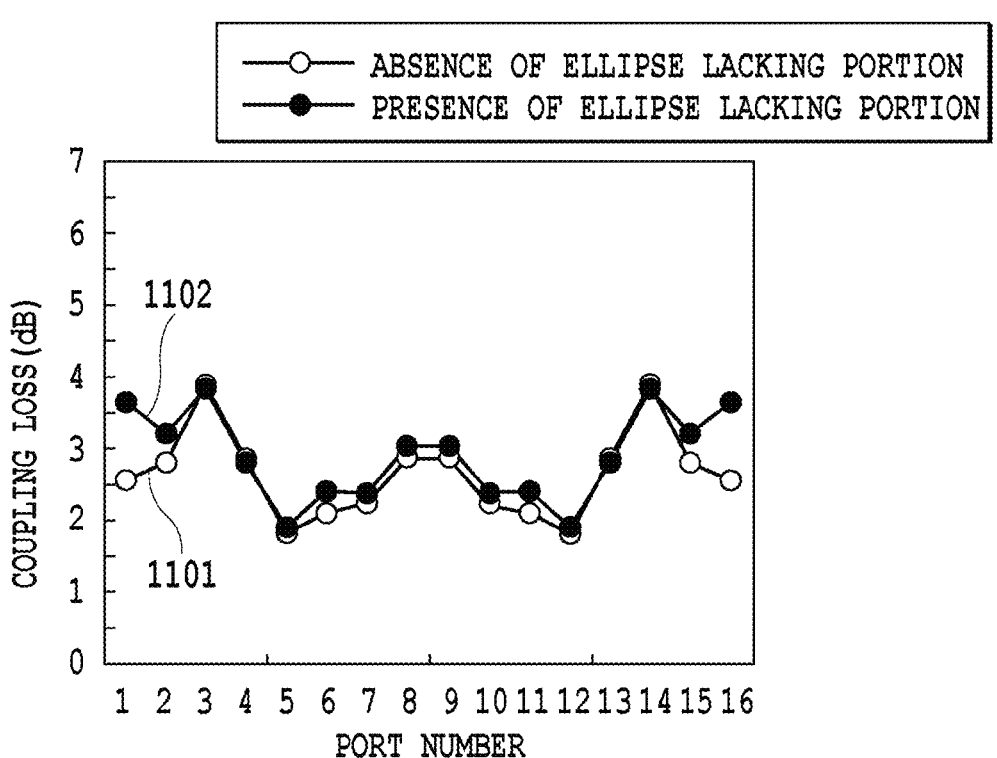
FIG. 11B is a diagram showing the result of measuring a coupling loss of the optical coupling/splitting device according to the embodiment 5 of the present invention.

FIG. 11A and FIG. 11B show measurement data 1102 of the optical coupling/splitting device 1000 of 16 splits that is designed and produced in this manner, wherein measurement data 1101 of an optical coupling/splitting device of 16 splits excluding only the elliptical core lacking portion 1023 from the optical coupling/splitting device 1000 for comparison is shown in addition thereto.

FIG. 11A is the result of evaluating the splitting loss of the optical coupling/splitting device of 16 splits of the above two kinds in the down-signal having the wavelength of 1.49 μm. As shown in FIG. 11A, in the measurement data 1101 as a sample without the core lacking portion 1023, there is obtained the result that the splitting loss between the respective ports varies in a large range of 8.3 dB to 25.3 dB, but in the measurement data 1102 as a sample with the elliptical core lacking portion, there is obtained the result that the splitting loss between the respective ports varies in a small range of 13.1 dB to 13.4 dB. Since a principled loss of the optical coupling/splitting device of 16 splits is 12 dB, there is obtained a good result that an excessive loss of the optical coupling/splitting device 1000 according to the embodiment 5 in the present invention at a splitting operation is in a range of 1.1 dB to 1.4 dB.

FIG. 11B is the result of evaluating the coupling loss of the optical coupling/splitting device of 16 splits of the above kinds in the up-signal having the wavelength of 1.31 μm. As shown in FIG. 11B, a difference between with and without the core lacking loss portion 1023 of the coupling losses of the up-signal is small. It should be noted that the coupling loss of the optical coupling/splitting device according to the embodiment 5 in the present invention is 3.8 dB at the worst value, 1.9 dB at the best value, 2.8 dB at an average loss value, and 1.9 dB at the loss variation.

Figure 12A:
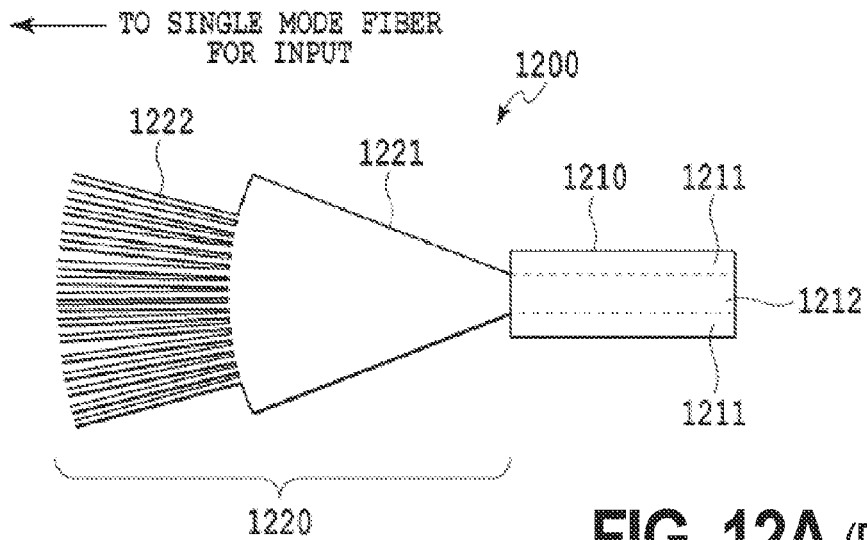
FIG. 12A is a diagram showing an optical coupling device of 16×1 by the conventional technology.
Figure 12B:
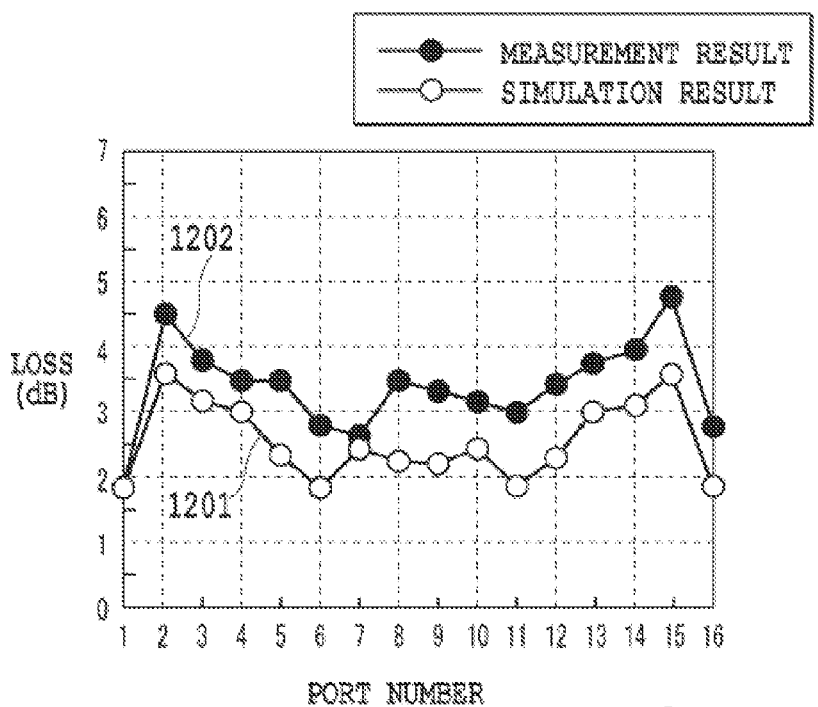
FIG. 12B is a diagram showing an optical coupling device of 16×1 by the conventional technology.

With reference to FIG. 12A and FIG. 12B, an optical coupling device described in PTL 3 will be explained as a comparison object to the optical coupling/splitting device according to the present invention. FIG. 12A shows the configuration of the conventional optical coupling device 1200 described in PTL 3. FIG. 12A shows the conventional coupler 1200 that is provided with an MMF 1210 and an optical waveguide 1220. The MMF 1210 is provided with MM clads 1211 and an MM core 1212, and the optical waveguide 1220 is provided with a slab waveguide 1221 and SM waveguides 1222. The MMF 1210 is formed of a GI type fiber having a diameter of 50 μm.

FIG. 12B shows the measurement result of port dependency in regard to a coupling loss of down-signals that are input to the conventional optical coupling device 1200. In FIG. 12B, a line 1201 shows a simulation result of the port dependency in regard to the coupling loss of the down-signals that are input to the conventional optical coupling device 1200, and a line 1202 shows a measurement result of the port dependency in regard to the coupling loss of the down-signals that are input to the conventional optical coupling device 1200.

As shown in the line 1202 in FIG. 12B, the coupling loss of up-signals that are output from the respective ports is 4.8 dB at the worst value, 1.8 dB at the best value, 3.3 dB at an average loss value, and 3.0 dB at the loss variation. As shown in FIG. 11A and FIG. 11B, and FIG. 12A and FIG. 12B, there is a difference among them, such as in a point where there is a difference in a refractive index distribution of the fiber in an output side or in a point where in the optical coupling device shown in FIG. 12A, the optical splitting function is not considered, but according to the optical coupling/splitting device 1000 according to the embodiment 5 in the present invention, there is realized an improvement of the coupling loss that the worst loss is 1 dB, the average value is 0.5 dB and the variation width is 1.1 dB, as compared to the conventional optical coupling device 1200 shown in FIG. 12A.

In this manner, as in the case of the optical coupling/splitting device 1000 according to the embodiment 5, when the core lacking portion 1023 is provided on the slab waveguide 1021, the propagation direction of the optical signal that is input to/output from the DMF 1010 can be bent. Therefore it is possible to reduce the loss and the loss variation. Particularly when a section of the core lacking portion 1023 that is close to the optical axis extension line is designed to be a diffusing lens, the seeming opening number by the SM portion of the DMF 1010 can be made large. That is, also in a case where the input/output port number is large, it is possible to reduce the value $L_1$ expressed by the above formula (3) to be small to make the slab waveguide length L closer to the value $L_2$ expressed by the above formula (4). In consequence, the coupling loss can be reduced.

In addition, by disposing the refractive index intensifying structure 1024, up-signal optical components that are emitted outside of the slab waveguide 1021 are confined in the slab waveguide 1021 to increase a rate by which the up-signals are introduced to the MM portion of the DMF 1010. Therefore it is possible to further reduce the coupling loss.

Embodiment 6

Figure 13A:
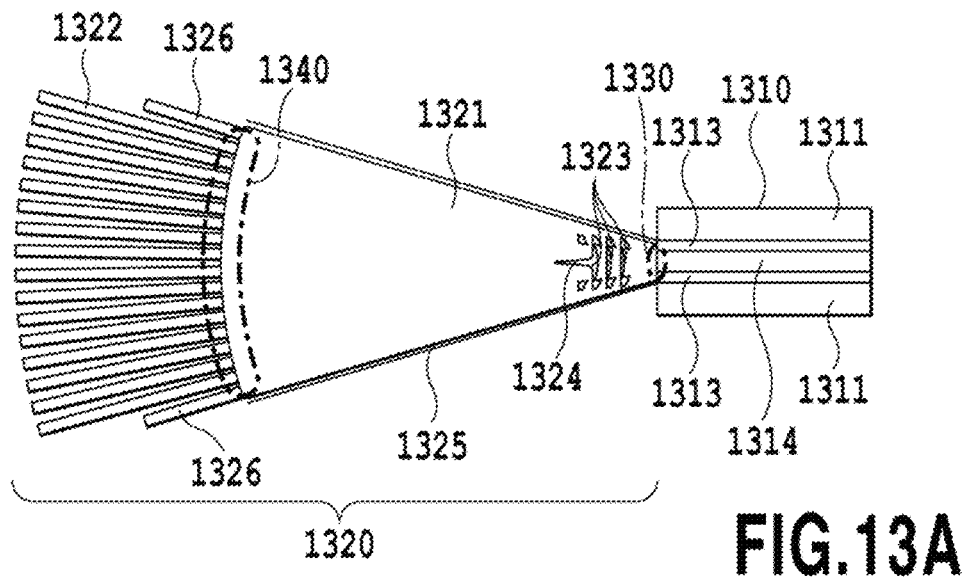
FIG. 13A is a diagram showing an optical coupling/splitting device according to an embodiment 6 of the present invention.
Figure 13B:
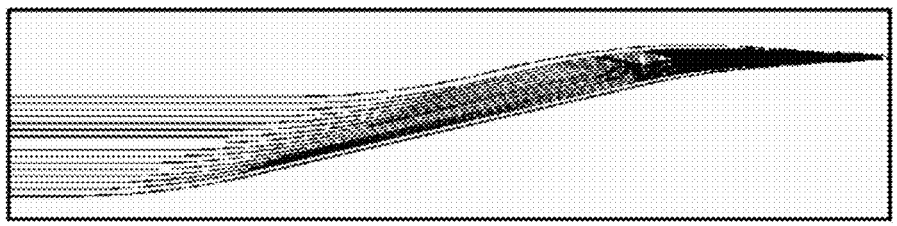
FIG. 13B is a diagram showing the optical coupling/splitting device according to the embodiment 6 of the present invention.
Figure 13C:
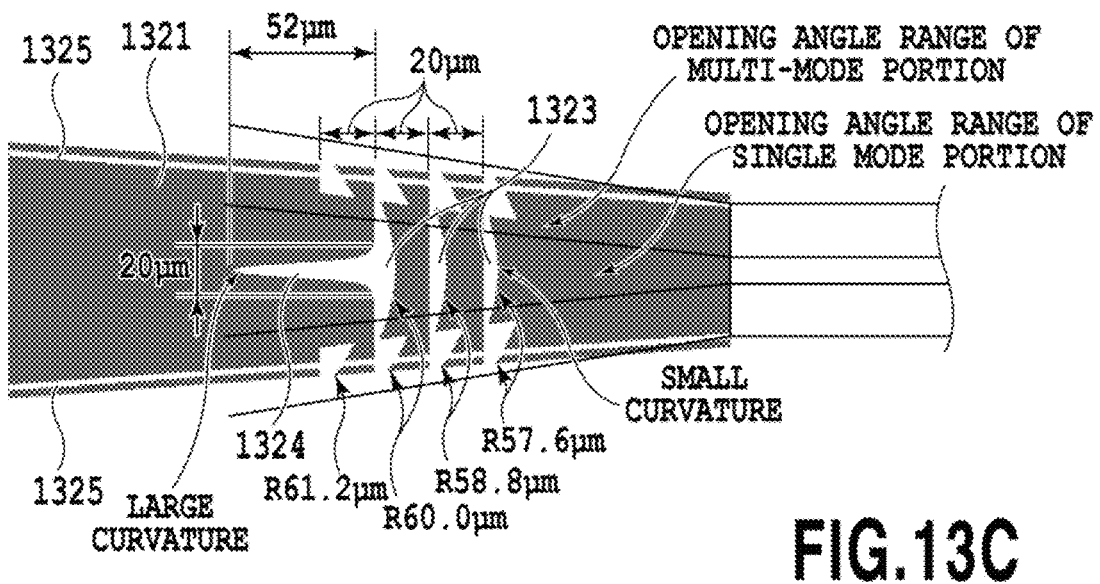
FIG. 13C is a diagram showing the optical coupling/splitting device according to the embodiment 6 of the present invention.

FIG. 13A to FIG. 13C show an optical coupling/splitting device 1300 according to an embodiment 6 in the present invention. FIG. 13A shows the configuration of the optical coupling/splitting device 1300 according to the embodiment 6 in the present invention. FIG. 13A shows the optical coupling/splitting device 1300 that is provided with a DMF 1310 and an optical waveguide 1320. The DMF 1310 is provided with MM clads 1311 and an MM core 1312, wherein the MM core 1312 is provided with SM clads 1313 and an SM core 1314. The optical waveguide 1320 is provided with a slab waveguide 1321 that is connected to the DMF 1310, SM waveguides 1322 that are connected to the slab waveguide 1321, and dummy waveguides 1326. The slab waveguide 1321 is provided with first core lacking portions 1323 each having small curvature and a Fresnel lens shape a width of which is large, a second core lacking portion 1324 having large curvature and having a narrow width, and a refractive index intensifying structure 1325 that intensifies the refractive index.

Here, the refractive index intensifying structure 1325 that intensifies the refractive index and the first core lacking portion 1323 having the wide Fresnel lens shape are installed primarily for improving the coupling loss of up-signals. Up-light that is incident from the optical waveguide 1320 tends to spread in a direction perpendicular to the propagation direction in the slab waveguide 1321. Therefore when the slab waveguide length is longer than $L_2$ described in the above formula (4), it is difficult to connect all the incident up-light to the MM core portion 1312 of the DMF 1310. If the slab waveguide length is inevitably longer than $L_2$ for the reason of many port numbers or the like, the refractive index intensifying structure 1325 is provided in the slab waveguide boundary to reflect more optical components and focus the incident light on the vicinity of the MM core portion 1312 of the DMF 1310. Thereby the coupling loss of the up-light can be improved.

However, for furthermore improving the coupling loss of the up-lights, the propagation direction of the collected light is required to be considered. Each time the up-light that is incident from the optical waveguide 1320 is reflected on the slab waveguide boundary, the propagation direction of the up-light is changed, and in a case of many numbers of times of reflection, the propagation direction is wider than an opening angle of the MM core portion 1312, the up-light cannot be connected to the MM core portion 1312. Therefore an element of playing a role for modifying the changed propagation direction to a propagation direction where the up-light can be again connected is the first core lacking portions 1323. When a wide lens portion crossing an entire slab is disposed very close to the MM core portion 1312, since an up-light component that cannot be connected to the MM core portion 1312 due to the propagation direction among the up-lights collected in the slab waveguide end can be connected to the MM core portion 1312, it is possible to further improve the coupling loss.

The DMF 1310 adopts an optical fiber having the same specification with the DMF 1010 to be used in the embodiment 5. The optical waveguide 1320 also uses a silica-based planar lightwave circuit having 0.3% of a relative refractive index difference as similar to the embodiment 5. An entire length of the slab waveguide 1321 is set to 1075 μm. The refractive index intensifying structure 1325 is disposed in the boundary not abutting on the DMF 1310 or the SM waveguides 1322 among the boundaries of the slab waveguide 1321, and is configured such that a linear core area, which has a gap width of 2.5 μm and a line width of 2.5 μm, is arranged in one line.

FIG. 13C shows an enlarged diagram of the periphery of the core lacking portion in the optical coupling/splitting device 1300 in the embodiment 6. FIG. 13C shows the plurality of the first core lacking portions 1323 each having a wide Fresnel lens shape. All the plurality of the first core lacking portions 1323 respectively have a flat convex lens structure having convexity to the right side, and are in series lined up by an interval of 20 μm within an opening angle of the MM portion of the DMF 1310 in such a manner as to cross the slab waveguide 1321, and are disposed on an extension line of an optical axis of the DMF 1310 to be line-symmetrical around the extension line of the optical axis of the DMF 1310. It should be noted that the core lacking portions 1323 are arranged such that a plane of the flat convex lens structure of the core lacking portion in closest proximity to the DMF is in a position of 590 μm from the DMF. A curvature radius of each of the plurality of the first core lacking portions 1323 is set in the order of 57.6 μm, 58.8 μm, 60 μm, and 61.2 μm from a side of the DMF.

Further, as shown in FIG. 13C, the second core lacking portion 1324 that has a non-spherical flat convex structure having convexity to the left and large curvature having an entire width of 20 μm or less, and an entire length of 52 μm is disposed on an extension line of an optical axis of the DMF 1310 in such a manner as to be line-symmetrical around the extension line of the optical axis of the DMF 1310 in a range not exceeding an opening angle range of the SM portion.

The plane of the non-spherical flat convex lens structure is arranged in a position of 640 μm from the DMF such that a plane side (right side) of the flat convex lens structure of the second core lacking portion 1324 and a plane side (left side) of the flat convex lens structure of the first core lacking structure 1323 overlap. This is because the plane side of the flat convex lens is weak in the force of collecting (diffusing) the light, but it is effective to reduce a total number of refractive index boundary surfaces on the optical axis for reducing the excessive loss of the entire device.

The above first core lacking portions 1323 are arranged to cross the slab waveguide 1321, and the second core lacking portion 1324 narrow in the width is arranged only in the central part of the slab waveguide 1321. It should be noted that when an area of the core lacking portion is large, it is impossible to confine the light in the core portion, and the loss of the device increases. Therefore the first core lacking portions 1323 are formed in a Fresnel lens shape and overlap in a multi-step, thus shortening a focus distance of the lens.

Since the above two core lacking portions and the DMF 1310 are closely-positioned, all optical power of the down-light that is incident from the SM portion 1314 of the DMF 1310 passes through the first core lacking portion 1323, and further, most (90%) of the optical power passes through the second core lacking portion 1324. That is, most (90% or more) of the optical power of the down-light is subjected to influences of both of the first core lacking portions 1323 and the second core lacking portion 1324.

On the other hand, the up-light that is incident from the optical waveguide 1320 connected to the opposite side of the slab waveguide 1321, because of a long distance from the optical waveguide end to the core lacking portion, arrives at the core lacking portion after the beam spot is expanded, and further after apart thereof is reflected on the slab waveguide boundary. Therefore in the vicinity of the core lacking portion, the up-light is diffused to the entire width of the slab waveguide 1321 in the longitudinal direction. The up-light that propagates through a portion away from the slab waveguide center in the vicinity of the core lacking portion is subjected to only the influence of the first core lacking portion 1323 arranged to cross the slab waveguide 1321 without being subjected to the influence of the second core lacking portion 1324 narrow in the width. However, the up-light that propagates through the slab waveguide center is subjected to the influence of the first core lacking portion 1323, and in addition thereto, is, though weak, subjected to the influence of the second core lacking portion 1324. For alleviating a difference in influence between the core lacking portions in the propagation area, the first core lacking portions 1323 in a Fresnel lens shape are structured to overlap in three layers on the center axis line of the slab waveguide 1321, but overlap in four layers in a peripheral portion away from the slab center axis.

Though repeated, in the vicinity of the above two core lacking portions, the optical power of the down-light concentrates on the central part of the slab waveguide 1321, the optical power of the up-light is dispersed on the entire area of the slab waveguide 1321. Therefore the down-light is strongly subjected to the influence of the second core lacking portion 1324 narrow in the width that is arranged only in the central part, and in reverse, the up-light is strongly subjected to the influence of the first core lacking portion in the Fresnel lens shape that is arranged to cross the slab waveguide 1321. These events do not occur completely independently, but a degree of the freedom of design is increased by one factor as compared to the optical coupling/splitting device having only the elliptical core lacking portion described in the embodiment 5. That is, in the optical coupling/splitting device described in the embodiment 6 in the present invention, a lens design optimal for each of the splitting loss of the down-light and the coupling loss of the up-light is possible.

Because of an increase on a degree of freedom of the lens design, the variation of the splitting loss or the coupling loss can be improved in the lens design alone, but, for making the splitting loss to the individual waveguide in complete agreement to the coupling loss from the individual waveguide, the improvement on the lens design alone is not sufficient. Therefore the splitting loss variation and the coupling loss variation are restricted by performing the following improvement in a connection portion 1340 between the slab waveguide 1321 and the SM waveguide 1322.

First, one dummy waveguide 1326 is arranged at each of both sides of the SM waveguides 1322 in the connecting portion 1340 between the slab waveguide 1321 and the SM waveguides 1322, and further, since the variation of the splitting loss depends greatly on the setting of the waveguide width, the waveguide width of each of the SM waveguides 1322 is set in the order of 7.5 μm, 11.1 μm, 6.7 μm, 6.7 μm, 7.1 μm, 7.1 μm, 7.7 μm, 7.7 μm, 7.0 μm, 7.0 μm, 7.7 μm, 7.7 μm, 7.1 μm, 7.1 μm, 6.7 μm, 6.7 μm, 11.1 μm, and 7.5 μm from the end, for reducing the variation of the splitting loss to be smaller.

In addition, since the variation of the coupling loss primarily depends greatly on the setting of the direction of the waveguide, the direction of each of the SM waveguides 1322 is adjusted while performing characteristics analysis by a beam propagation method such that the variation of the coupling loss is also smaller. As a result, a crossing point between an optical axis extension line of each of the SM waveguides 1322 in the connecting portion 1340 and an optical axis extension line of the DMF 1310 in the connecting portion 1330 between the DMF 1310 and the slab waveguide 1321 is distributed in a range of ±200 μm around the center of the connecting portion 1330. When both of the waveguide width and the direction of the waveguide are simultaneously adjusted, it is possible to reduce both of the variation of the splitting loss and the variation of the coupling loss to be smaller.

FIG. 13B is a layout diagram expressing an entire configuration of a chip that is produced using the optical coupling/splitting device 1300 according to the embodiment 6. As shown in FIG. 13B, the minimum offset amount given for preventing ortho-facing of the SMF and the DMF is set to 750 μm as similar to that of the optical coupling/splitting device 1000 according to the embodiment 5, and a final chip size is also made to 4 mm×17 mm.

Figure 14A:
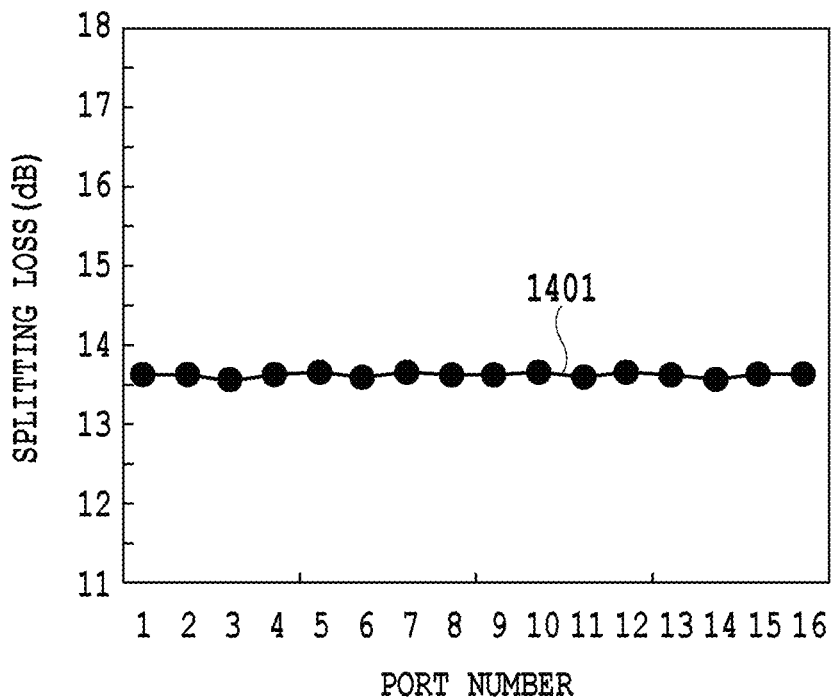
FIG. 14A is a diagram showing the result of measuring a splitting loss of the optical coupling/splitting device according to the embodiment 6 of the present invention.
Figure 14B:
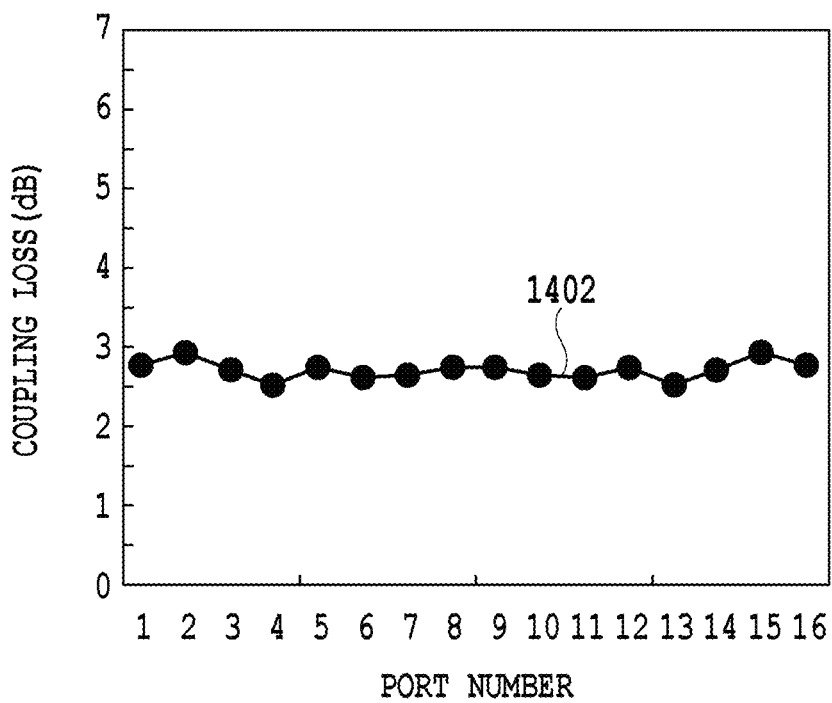
FIG. 14B is a diagram showing the result of measuring a coupling loss of the optical coupling/splitting device according to the embodiment 6 of the present invention.

FIG. 14A and FIG. 14B show chip measurement data that is produced using the optical coupling/splitting device 1300 according to the embodiment 6 in the present invention. FIG. 14A shows the result of evaluating port dependency in regard to an optical splitting loss of a down-signal having a wavelength of 1.57 μm that is input to the optical coupling/splitting device 1300 of 16 splits. As shown in a line 1401 of FIG. 14A, in the optical coupling/splitting device 1300 in the embodiment 6, the splitting loss transitions in the vicinity of 13.5 dB, and the excessive loss to the principled loss 12 dB of the optical coupling/splitting device of 16 branche is in a range of 1.5 dB to 1.6 dB. In addition, the splitting loss variation is 0.1 dB, thus obtaining a good result.

FIG. 14B shows the result of evaluating port dependency in regard to an optical coupling loss of up-signals each having a wavelength of 1.27 μm. As shown in a line 1402 of FIG. 14B, in the optical coupling/splitting device 1300 in the embodiment 6, the coupling loss of the up-signal that is output from each port is 2.9 dB at the worst value, 2.5 dB at the best value, 2.7 dB at an average loss value, and 0.4 dB at the loss variation. There is achieved a further improvement of the coupling loss that the worst loss is 0.9 dB, the average value is 0.1 dB and the variation width is 1.5 dB, as compared to the optical coupling/splitting device 1300 according to the embodiment 1.

In this manner, when the optical coupling/splitting device 1300 according to the embodiment 6 is used, the seeming opening number of the SM portion in the DMF 1310 is made large by bending the down-light in the second core lacking portion 1324 arranged in the slab center to reduce the coupling loss, and further, it is possible to improve the coupling loss also in the refractive index intensifying structure 1325 and in the first core lacking portion 1323 in the Fresnel lens shape arranged to cross the slab waveguide 1321. Further, in the connecting portion 1340 between the slab waveguide 1321 and the SM waveguide 1322, the variation of the splitting loss can be made small by adjusting the width of the SM waveguide 1322, and the variation of the coupling loss can be made small by adjusting the direction of the SM waveguide 1322.

As explained in the above embodiments 5 and 6, when the optical coupling/splitting device according to each of the embodiments 5 and 6 is used, it is possible to restrict the coupling loss variation or the splitting loss variation of the optical coupling/splitting device itself to be small in both of an up-light signal coupling time and a down-light signal splitting time. As a result, in the PON system for optical subscriber in which the loss budget is expanded by the improvement on the system, a system margin due to the loss variation of the optical splitting/coupling device is made small, and as a result, the effect as similar to a case of equivalently expanding the loss budget by the reduced amount can be obtained.

Embodiment 7

An optical coupling/splitting device according to each of embodiments 7 to 9 that will be hereinafter explained is an optical device of a single kind, and is characterized by having a splitting function of a down-signal, a coupling function of up-signals, and further, a wavelength multiplexing/demultiplexing function for multiplexing/demultiplexing the down-signal and the up-signal together in an optical subscriber network. Therefore in the optical coupling/splitting device according to each of the embodiments 7 to 9, the wavelength multiplexing/demultiplexing device that is necessary in the conventional system configuration is unnecessary. Thereby it has an advantage of being able to provide a practical system that realizes a reduction of initial investment costs and the downsizing of the transmission device, and further, is low in a failure rate.

Figure 15:
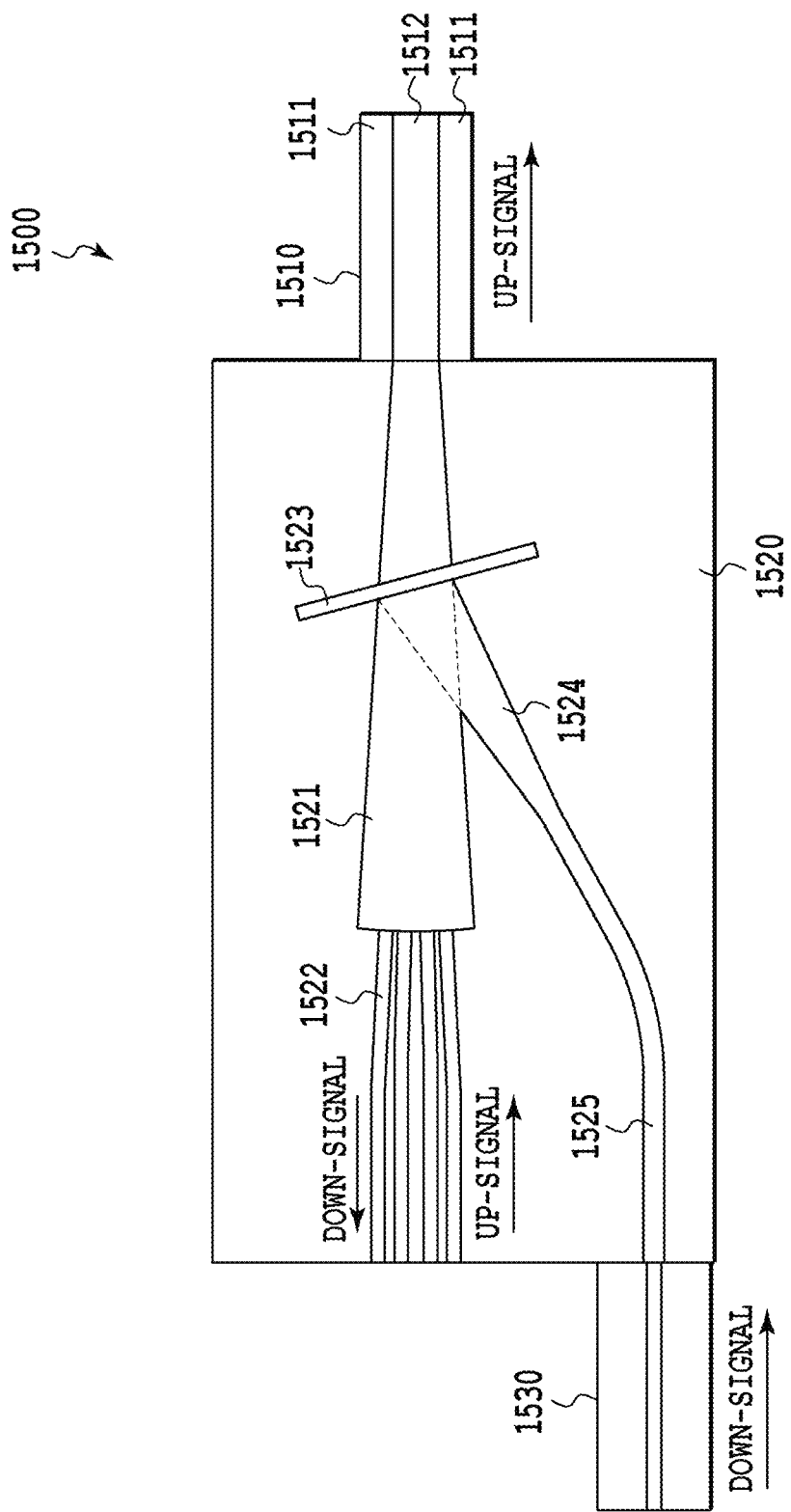
FIG. 15 is a diagram showing the configuration of an optical coupling/splitting device according to an embodiment 7 of the present invention.

FIG. 15 shows the configuration of an optical coupling/splitting device 1500 according to the embodiment 7 in the present invention. FIG. 15 shows the optical coupling/splitting device 1500 that is provided with an MMF 1510, a PLC 1520 that is connected to the MMF 1510, and an SMF 1530 that is connected to the PLC 1520. The PLC 1520 is provided with a slab waveguide 1521 that is connected to the MMF 1510, SM waveguides 1522 that are connected to the slab waveguide 1521, a thin film filter (TFF) 1523 that is inserted into the slab waveguide 1521, a slab waveguide additional portion 1524 for input signal that is disposed in the slab waveguide 1521, and an input port 1525 for down-signal that is connected to the slab waveguide additional portion 1524 for input signal and the SMF 1530.

The TFF 1523 is designed to be inclined at a predetermined angle to an optical axis of the MMF 1510 to be inserted in the slab waveguide 1521, reflect the down-signal light having a wavelength of 1.49 μm to 1.57 μm that is input to an input port 1525 for down-signal, and allow transmission of up-signal light having a wavelength of from 1.27 μm to 1.31 μm.

The down-signal light that is input from the SMF 1530 to the PLC 1520 through the input port 1525 for down-signal passes through the slab waveguide additional portion 1524 for input signal, is reflected by the TFF 1523, and passes through the slab waveguide 1521 to be split, which are output to the SM waveguides 1522 connected to the respective subscriber devices 110 shown in FIG. 1. On the other hand, the up-signal lights that are input from the respective subscriber devices 110 to the PLC 1520 through the respective SM waveguides 1522 pass through the slab waveguide 1521 and TFF 1523, which are coupled to the MMF 1510 for output.

In the optical coupling/splitting device 1500 according to the embodiment 7, when the transmitter 134 is connected to an input end of the down-signal of the SMF 1530, and the receiver 135 is connected to an output end of the up-signal of the MMF 1510, the function that can be realized by a plurality of optical devices in the accommodation station 130 shown in FIG. 1 can be realized using the optical coupling/splitting device 1500 according to the embodiment 7.

As explained above, by using the optical coupling/splitting device 1500 according to the embodiment 7, the number of components can be largely reduced as compared to that of the conventional optical transmit-receive system, and the connection arrangement of the optical devices can be made in a simple configuration. As a result, it is possible to restrict an increase of initial investment costs and degradation in reliability of the system due to complexity of the configuration and many components, and further, an increase in size of the system to be generated for the reason that many optical devices are required to be accommodated in the system.

However, a refractive index of the TFF 1523 has refractive angle dependency and polarization dependency of signal light, and further, a beam profile of input signal light that propagates through the slab waveguide additional portion 1524 for input signal and the slab waveguide 1521 is not necessarily flat. Therefore an optical density of the input signal light at the time of arriving at the boundary between the slab waveguide 1521 and the SM waveguide 1522 varies between the respective SM waveguides 1522.

There is a method of changing a waveguide width of the SM waveguide 1522 as an effective method for correcting this variation, but in a case where the piece number of the SM waveguides 1522 exceeds the order of four pieces and is below the order of 64 pieces, it is difficult to ideally correct the variation even in the method of changing waveguide width. That is, in a case where there are many input and output ports that are connected to the SM waveguides 1522, an excessive loss or a variation in transmission loss between input and output ports becomes remarkably large as compared to the splitter configuration of connecting the existing Y splitting waveguide. As a result, there more easily occurs a fault that a signal cannot be received in the input and output port that is large in the loss. For avoiding this fault, there remains a problem that it is necessary to set the loss budget to be small at a system design time. In addition, there is a problem that inserting and fixing the TFF 1523 causes the process number to increase and the manufacturing costs to increase.

Embodiment 8

Figure 16:
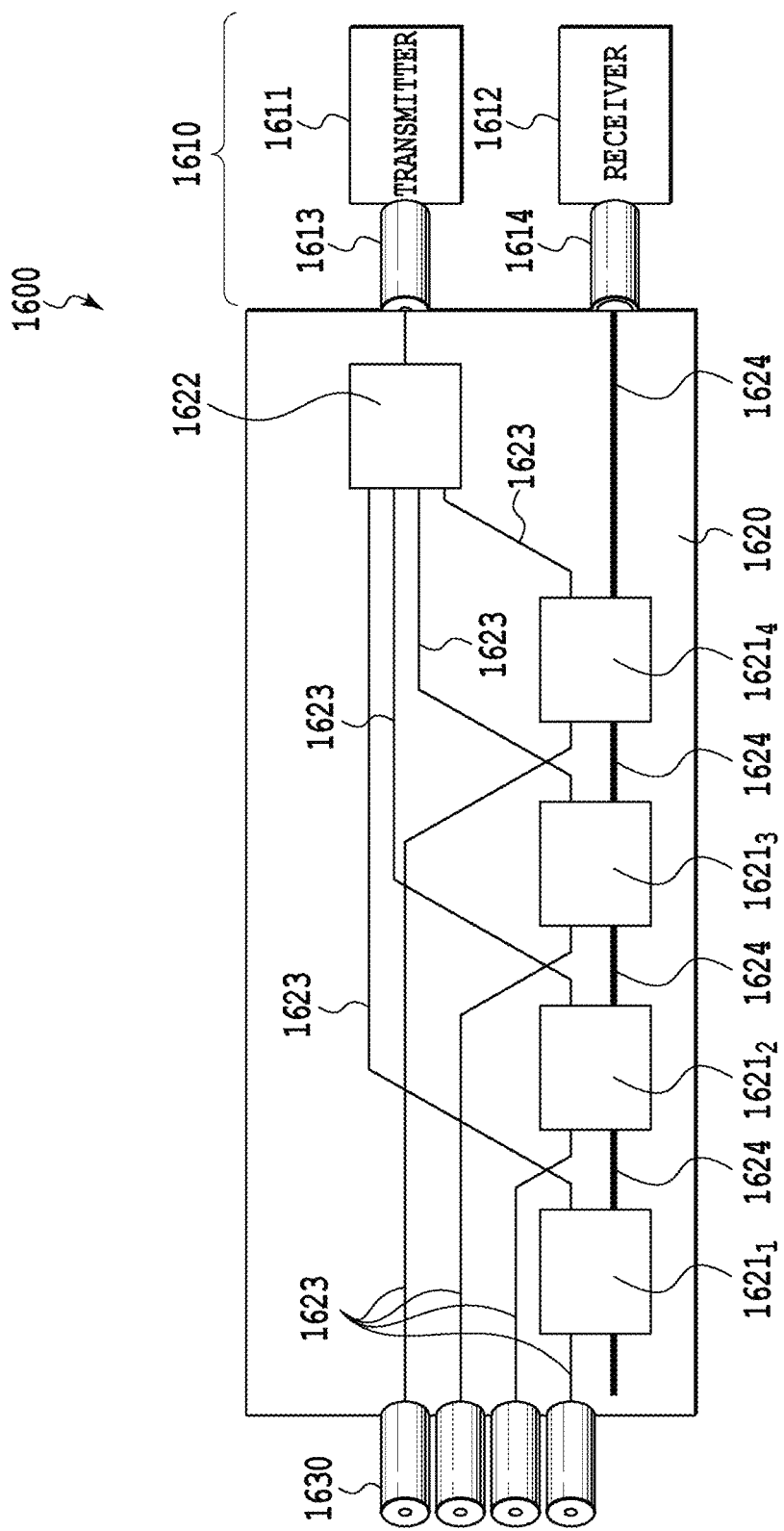
FIG. 16 is a diagram showing the configuration of an optical transmit-receive system using an optical coupling/splitting device according to an embodiment 8 of the present invention.

FIG. 16 shows the configuration of an optical transmit-receive system using an optical coupling/splitting device 1620 according to an embodiment 8 in the present invention. FIG. 16 shows the optical transmit-receiver system 1600 that is provided with an OLT 1610, an optical coupling/splitting device 1620 that is connected to the OLT 1610, and SMFs 1630 that are connected to the optical coupling/splitting device 1620. The OLT 1610 is provided with a transmitter 1611 that is connected to the optical coupling/splitting device 1620 through an SFM 1613, and a receiver 1612 that is connected to the optical coupling/splitting device 1620 through an MMF 1614. The optical coupling/splitting device 1620 is provided with four multi-mode converting and coupling elements $1621_1$ to $1621_4$ that are respectively connected to the SMFs 1630, and a splitter element 1622 that is connected to each of the multi-mode converting and coupling elements $1621_1$ to $1621_4$ and is connected to the transmitter 1611 through the SMF 1613.

In the optical coupling/splitting device 1620 according to the embodiment 8, the four multi-mode converting and coupling elements $1621_1$ to $1621_4$ are used. Each of the four multi-mode converting and coupling elements $1621_1$ to $1621_4$ may adopt a directional coupler element of a non-equal width, for example. The respective multi-mode converting and coupling elements $1621_1$ to $1621_4$ are connected serially to each other at ports connected to the MM waveguides 1624 through the MM waveguides 1623, and the multi-mode converting and coupling element $1621_4$ is connected to the receiver 1612 through the MMF 1614.

In addition, in the multi-mode converting and coupling elements $1621_1$ to $1621_4$, the one ports connected to the SM waveguides 1623 are respectively connected to the subscriber devices 110 through the SMFs 1630. The other ports connected to the SM waveguides 1623 are connected to the splitting element 1622, and finally are connected to the transmitter 1611 through the SMF 1613.

The down-signal that is output from the transmitter 1611 is output to the splitting element 1622 through the SMF 1613. The splitting element 1622 splits the input down-signal in such a manner that the respective optical intensities become equal, which are output to the multi-mode converting and coupling elements $1621_1$ to $1621_4$. Down-signals are input at down-signal input ports to the multi-mode converting and coupling elements $1621_1$ to $1621_4$, and the input down-signals are output to the respective SMFs 1630 through input/output ports of the up and down-signals.

Up-signals that are input to the upper and lower signal input/output ports of the multi-mode converting/coupling elements $1621_1$ to $1621_4$ through the respective SMFs 1630 will respectively be coupled via an operation to be hereinafter described, which is output to the receiver 1612 via the MMF 1614.

Operational characteristics of the multi-mode converting/coupling element will be explained with reference to an example of a multi-mode converting/coupling element formed of a directional coupler element of a non-equal width shown in FIG. 17A to FIG. 17C. First, with reference to FIG. 17A, FIG. 17B and FIG. 18, there will be explained a state where up-signals each having a 1.27 µm-wavelength are subjected to mode conversion and are coupled. In FIG. 17A to FIG. 17C, there is shown a directional coupler element 1700 of a non-equal width provided with a waveguide 1710 of a small width having an input port $1710_{in}$ and an output port $1710_{out}$, and a waveguide 1720 of a large width having an input port $1720_{in}$ and an output port $1720_{out}$. In FIG. 17B, a functional length 1, a gap width g and a waveguide w are exemplified.

FIG. 17A shows a state where zero-order mode light is converted into a second-order mode light that will be output to a cross port. The input port $1710_{in}$ and the output port $1710_{out}$ are respectively connected to the waveguides 1623 shown in FIG. 16, and the input port $1720_{in}$ and the output port $1720_{out}$ are respectively connected to the MM waveguides 1624 shown in FIG. 16.

As shown in FIG. 17A, when the zeroth-order mode light of a wavelength of 1.27 µm is input to the input port $1710_{in}$ connected to the SM waveguide 1623, the zeroth-order mode light is subjected to mode conversion in the directional coupler elements 1710 and 1720 each having the non-equal width, which is output to the output port $1720_{out}$ connected to the MM waveguide 1624 which is the cross port. The order of the optical signal after mode conversion is uniquely determined by a combination of a waveguide width w of the waveguide 1710 of the small width and a waveguide width w of the large width 1720 of the large width.

Figure 18:
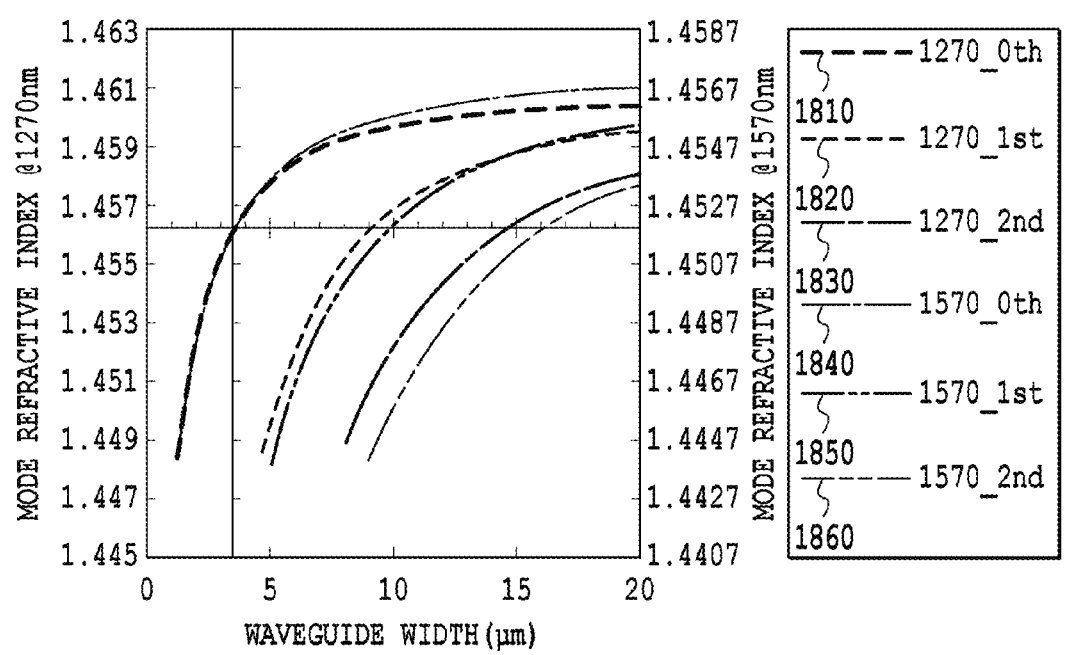
FIG. 18 is a graph showing a relation between a waveguide width of a silica waveguide and a mode refractive index of each of zeroth order, first order and secondary order.

FIG. 18 is a graph showing a relation between a waveguide width of a silica-based waveguide, and a mode refractive index of each of zeroth order, first order and second order. In FIG. 18, lines 1810 to 1830 each show a relation between a mode refractive index of each of zeroth order, first order and second order in the optical signal of a 1.27 µm wavelength and a waveguide width, and lines 1864 to 1860 each show a relation between a mode refractive index of each of zero order, first order and second order in the optical signal of a 1.57 µm wavelength and a waveguide width.

In a case where the waveguide width w of the waveguide 1710 of the small width is set to 3.5 μm and the waveguide width w of the waveguide 1720 of the large width is set to 9.2 μm, the mode refractive index of the zeroth-order mode light (line 1810) of the 1.27 μm wavelength that propagates through the waveguide 1710 of the small width is in agreement to the mode refractive index of the first-order mode light (line 1820) of the 1.27 μm wavelength that propagates through the waveguide 1720 of the large width, which creates a state where the phase alignment is established. Therefore if the functional length 1 and the gap width g of the directional coupler element of the non-equal width are appropriately designed, when the zeroth-order mode light of the 1.27 μm wavelength is input to the input port 1710$_{in}$ coupled to the waveguide 1710 of the small width, the first-order mode light is output to the output port 1720$_{out}$ coupled to the waveguide 1720 of the large width which is the cross port.

Likewise, in a case where the waveguide width w of the waveguide 1710 of the small width is set to 3.5 μm and the waveguide width w of the waveguide 1720 of the large width is set to 14.9 μm, the mode refractive index of the zeroth-order mode light (line 1810) of the 1.27 μm wavelength that propagates through the waveguide 1710 of the small width is in agreement to the mode refractive index of the second-order mode light (line 1830) of the 1.27 μm wavelength that propagates through the waveguide 1720 of the large width, which creates a state where the phase alignment is established. Therefore if the functional length 1 and the gap width g of the directional coupler element of the non-equal width are appropriately designed, when the zeroth-order mode light of the 1.27 μm wavelength is input to the input port 1710$_{in}$ coupled to the waveguide 1710 of the small width, the second-order mode light is output to the output port 1720$_{out}$ coupled to the waveguide 1720 of the large width which is the cross port.

On the other hand, FIG. 17B shows a state where the input zeroth-order mode light and first-order mode light are output to the through port without conversion. As shown in FIG. 17B, the zeroth-order mode light and the first-order mode light each having a 1.27 μm wavelength that are input to the input port 1720$_{in}$ pass through the directional coupler element 1700 of a non-equal width without mode conversion, and are output to the output port 1720$_{out}$ which is the through port. When the combination of the waveguide widths w of the waveguides 1710 and 1720 is designed in such a manner that the order of the zeroth-order mode light output in the output port 1720$_{out}$ does not overlap the order of the first-order mode light output in the output port 1720$_{out}$, a multi-mode converting/coupling element of a low loss can be realized by the element configuration showed in each of FIG. 17A and FIG. 17B.

Next, an explanation will be made of a case of inputting a down-signal light of a 1.57 μm wavelength with reference to FIG. 17A and FIG. 17B. FIG. 17C shows a state where the input zeroth-order mode light is output to the through port without conversion. As shown in FIG. 17C, there will be considered a case of inputting the zeroth-order mode light of a 1.57 μm wavelength to the input port 1720$_{in}$.

In a case where the waveguide width w of the waveguide 1710 of the small width is set to 3.5 μm and the waveguide width w of the waveguide 1720 of the large width is set to 9.2 μm, there occurs a state where the phase alignment is established although it is not established as much as in a case of the 1.27 μm wavelength. Further, since the signal light of a 1.57 μm wavelength is longer in wavelength than the signal light of a 1.27 μm wavelength and the confinement into the waveguide is weak, skirts of optical distributions of each other between modes traveling in parallel in the adjacent waveguides overlap and the signal light is connected more strongly than the signal light of a 1.27 μm wavelength.

The phase alignment of the signal light is not complete, but the connecting is strong. Therefore, 80% or more of the mode conversion and the transfer of the signal light between waveguides are generated in substantially a half of the functional length. Further, since the overlap of the skirts of the optical distributions can be adjusted by a width of a gap between the adjacent waveguides, it is possible to design the functional length of the signal light of a 1.57 μm wavelength to just a half of the functional length of the signal light of a 1.27 μm wavelength.

As described above, when the waveguide gap and the functional length are optimally designed, the directional coupler element of a non-equal width, which connects the 1.57 μm signal light twice while connecting the 1.27 μm signal light one time, can be obtained. At this time, the zeroth-order mode light of the 1.57 μm wavelength is subjected to mode conversion twice. That is, since this mode light is back to the original state, it is not subjected to the mode conversion seemingly, and is output to the through port as it is.

It should be noted that each of the wavelength dependency of the mode conversion and the wavelength dependency of the transfer of the signal light between the waveguides is linear to the functional length 1, and is in proportion to a gap width g with overlap integration of Gauss' function. Therefore the up-signal light of the 1.27 μm wavelength operates as shown in FIG. 17A and FIG. 17B, and the down-signal light of the 1.57 μm wavelength operates as shown in FIG. 17C. Thereby it is possible to realize the multi-mode converting/coupling element that causes the operations shown in FIG. 17A to FIG. 17C to be compatible.

In consequence, in the system shown in FIG. 16, when the down-signal light of the 1.57 μm wavelength is input to each of the multi-mode converting/coupling elements 1621$_1$ to 1621$_4$, as shown in FIG. 17C the down-signal light is output to the through port, and thereby the down-signal lights are respectively output to the SMFs 1623.

When the down-signal light of the 1.27 μm wavelength is input to the multi-mode converting/coupling element 1621$_1$, as shown in FIG. 17A the up-signal light is output to the cross port, and thereby the up-signal light is output to the multi-mode converting/coupling element 1621$_2$. When the up-signal light is input to each of the multi-mode converting/coupling elements 1621$_1$ to 1621$_4$, as shown in FIG. 17B the up-signal light is output to the cross port, and thereby the up-signal light is finally output to the receiver 1612.

In a case of the multi-mode converting/coupling element of converting the zeroth-order mode light into the first-order mode light, the waveguide width of the waveguide 1710 of the small width can be set to 3.5 μm, the waveguide width of the waveguide 1720 of the large width can be set to 9.2 μm, the functional length can be set to 800 μm, and the gap width can be set to 2.3 μm. In a case of the multi-mode converting/coupling element of converting the zeroth-order mode light into the second-order mode light, the waveguide width of the waveguide 1710 of the small width can be set to 3.5 μm, the waveguide width of the waveguide 1720 of the large width can be set to 14.9 μm, the functional length can be set to 1100 μm, and the gap width can be set to 2.3 μm. In a case of the multi-mode converting/coupling element of converting the zeroth-order mode light into the third-order mode light, the waveguide width of the waveguide 1710 of the small width can be set to 3.5 μm, the waveguide width of the waveguide 1720 of the large width can be set to 21.0 μm, the functional length can be set to 1400 μm, and the gap width can be set to 2.3 μm. In a case of the multi-mode converting/coupling element of converting the zeroth-order mode light into the fourth-order mode light, the waveguide width of the waveguide 1710 of the small width can be set to 3.5 μm, the waveguide width of the waveguide 1720 of the large width can be set to 27.0 μm, the functional length can be set to 1800 μm and the gap width can be set to 2.6 μm. In a case of designing the multi-mode converting/coupling element as described above, the multi-mode converting/coupling element together with the wavelength multiplexing/demultiplexing function as shown in FIG. 17A to FIG. 17C can be realized.

The optical coupling/splitting device 1620 as described above is designed such that the multi-mode converting/coupling element of converting the zeroth-order mode light into the first-order mode light, the multi-mode converting/coupling element of converting the zeroth-order mode light into the second-order mode light, the multi-mode converting/coupling element of converting the zeroth-order mode light into the third-order mode light, and the multi-mode converting/coupling element of converting the zeroth-order mode light into the fourth-order mode light are in series connected as shown in FIG. 16, and one of the two remaining ports in each of the multi-mode converting/coupling elements is connected to the splitting element 1622 and the other port is connected to each of the SMFs 1630 coupled to the respective subscriber devices 110. For producing the above optical coupling/splitting device 1620, the film forming device by a flame deposition method and a reactive ion-etching processing device are used.

The optical coupling/splitting device 1620 according to the embodiment 8 produced as described above can cut down largely on the process relating to man-power costs at manufacturing since the process of insert and fixation of the TFF 1523 can be eliminated, as compared to the optical coupling/splitting device 1500 according to the embodiment 7. Further, it is possible to restrict the polarization dependency due to oblique input on the TFF 1523 to be small. Even in a case where the port number is four or more, as compared to the splitter configuration of coupling the existing Y splitting waveguide, the excessive loss or the variation in transmission loss between the input/output ports can be obtained to the same extent, and it is confirmed that it is not necessary to set the loss budget to be small at a system designing.

However, in a case of designing an optical coupling/splitting device in which the port number in the subscriber device side is more than eight in the optical transmit-receive system 1600 according to the embodiment 8, there is a problem that the device length is made long due to a larger allowance bending radius of the MM waveguide, leading to higher costs. In addition, in the optical transmit-receive system 1600 according to the embodiment 8, for obtaining an arbitrary wavelength multiplexing/demultiplexing ratio, the multi-mode converting/coupling elements having greatly different gap widths are required in the same device. As a result, considering the device size or the degree of the processing accuracy to be required, however possible it is on a theory, such an optical splitting/coupling device cannot be the one that is commercially possible in terms of costs.

It should be noted that an example where the wavelength of the up-signal is set to 1.27 μm, and the wavelength of the down-signal is set to 1.57 μm is explained until herein, but the wavelength dependency of the multi-mode converting/coupling element as shown in FIG. 17A to FIG. 17C is weak within a region of the order of a wavelength width of 100 nm. Therefore the similar effect can be obtained also in a case where the optical coupling/splitting device 1620 according to the embodiment 8 is used, for example, in the PON system in which the up-signal is set to a wavelength of 1.31 μm and the down-signal is set to a wavelength of 1.49 μm.

Embodiment 9

Figure 19:
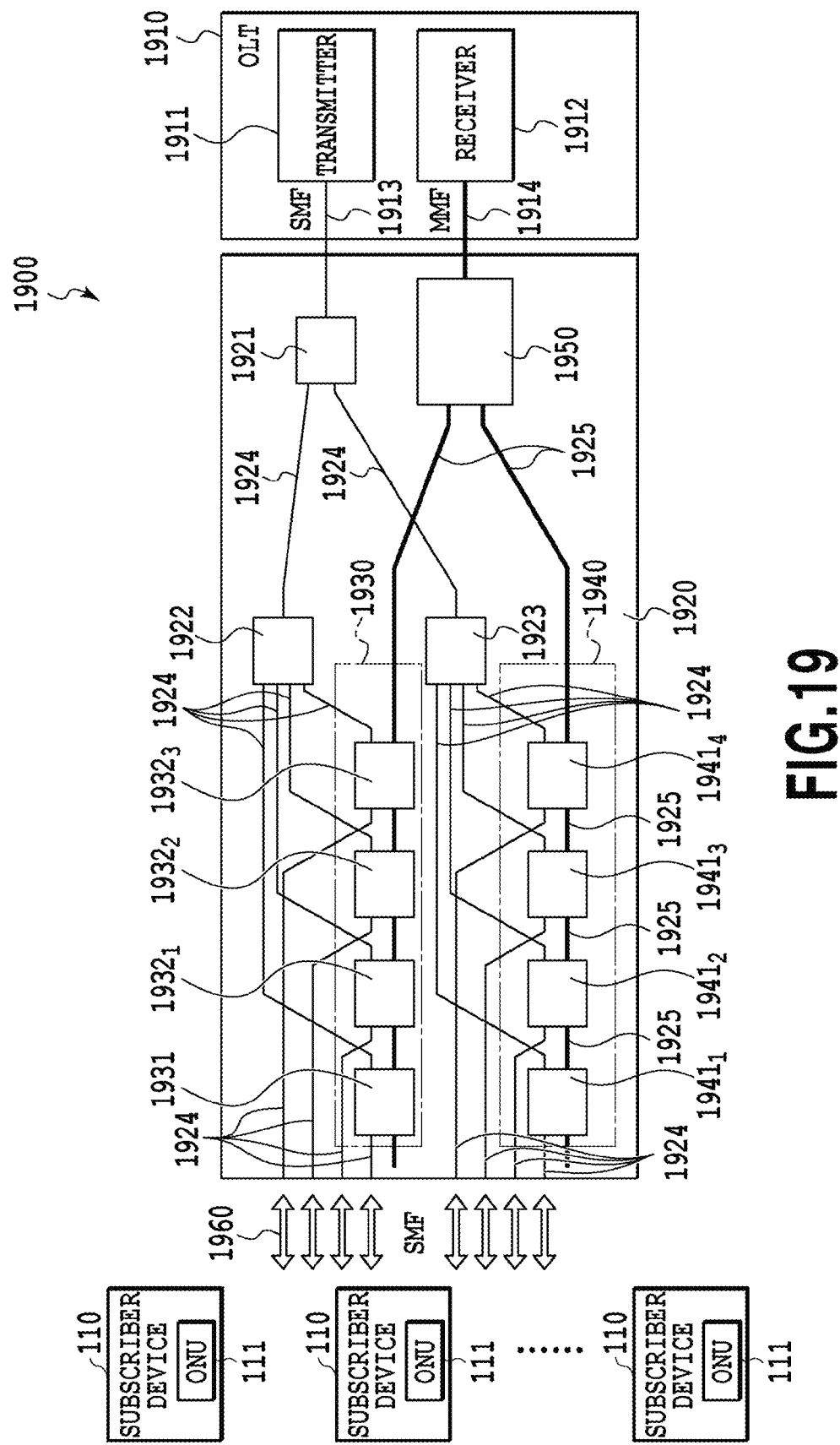
FIG. 19 is a diagram showing the configuration of an optical coupling/splitting device according to an embodiment 9 of the present invention.

FIG. 19 shows the configuration of an optical coupling/splitting device 1900 according to an embodiment 9 in the present invention. FIG. 19 shows the optical coupling/splitting device 1900 that is provided with an OLT 1910 and a PLC 1920. The PLC 1920 is provided with a first splitter element 1921 that is connected to s transmitter 1911 of the OLT 1910 through an SMF 1913, a second splitter element 1922 and a third splitter element 1923 that are respectively connected to the first splitter element 1921 through SM waveguides 1924, a first circuit portion 1930 that is connected to the second splitter element 1922 and SMFs 1960 through the SM waveguides 1924, a second circuit portion 1940 that is connected to the third splitter element 1923 and the SMFs 1960 through the SM waveguides 1924, and a multi-mode coupling element 1950 of two inputs and one output that is connected to the first circuit portion 1930 and the second circuit portion 1940 through MM waveguides 1925 and is connected to a receiver 1912 of the OLT 1910 through an MMF 1914.

The SMFs 1960 are connected to the subscriber devices 110. The first circuit portion 1930 is configured such that a multi-mode converting/coupling element 1931 formed of a directional coupler element a waveguide width of which is equal and multi-mode converting/coupling elements $1932_1$ to $1932_3$ each formed of a directional coupler element a waveguide width of which is not equal are respectively connected serially. The second circuit portion 1940 is configured such that multi-mode converting/coupling elements $1941_1$ to $1941_4$ each formed of a directional coupler element a waveguide width of which is not equal are respectively connected serially.

The first circuit portion 1930 is designed in such a manner as to output a signal light of even number-order of zeroth, second, fourth or sixth-mode order through the MM waveguides 1925. The second circuit portion 1940 is designed in such a manner as to output a signal light of odd number-order of first, third, fifth or seventh-mode order through the MM waveguides 1925.

The down-signal that is output from the transmitter 1911 is output to the first splitter element 1921 through the SMF 1913. The first splitter element 1921 splits the input down-signal in such a manner that the respective optical intensities become equal, which are output to the second splitter element 1922 and the third splitter element 1923. The second splitter element 1922 splits the input down-signal in such a manner that the respective optical intensities become equal, which are output to the multi-mode converting/coupling elements 1931, and $1932_1$ to $1932_3$ in the first circuit portion 1930. The third splitter element 1923 splits the input down-signal in such a manner that the respective optical intensities become equal, which are output to the multi-mode converting/coupling elements $1941_1$ to $1941_4$ in the second circuit portion 1940. The down-signal is input to each of the multi-mode converting/coupling elements 1931, $1932_1$ to $1932_3$, and $1941_1$ to $1941_4$ at a down-signal input port, and the input down-signal is output to each of the SMFs 1960 through an up/down-signal input/output port.

Up-signals that are input to the up/down signal input/output ports of the multi-mode converting/coupling elements, 1931, $1932_1$ to $1932_3$ in the first circuit portion 1930 through the respective SMFs 1960 will respectively be coupled in the first circuit portion 1930, which is output to one input port of the multi-mode coupling element 1950 of two inputs and one output through the MM waveguides 1925. Up-signals that are input to the up/down signal input/output ports of the multi-mode converting/coupling elements, $1941_1$ to $1941_4$ in the second circuit portion 1940 through the respective SMFs 1960 will respectively be coupled in the second circuit portion 1940, which is output to the other input port of the multi-mode coupling element 1950 of two inputs and one output through the MM waveguides 1925. The up-signals that are input to the multi-mode coupling element 1950 of two inputs and one output are further subjected to multi-mode conversion and coupling, which is output to the receiver 1912 through the MMF 1914.

The multi-mode converting/coupling element 1931 is configured of a directional coupler element a waveguide width of which is equal. In general, since the multi-mode converting/coupling element of N-port input/output has the limit to the order conversion, a high-order mode tends to be easily generated. Since the waveguide width of the optical waveguide is necessary to be the wider as the mode order is the higher, in a case of the high-order mode the waveguide width is necessary to be made wide for increasing an allowance propagation order of the output waveguide. When the waveguide width becomes wide, it is required to widen a light receiving diameter of an optical receiver for guiding all the optical signals from the waveguide to the receiver, and when the light receiving diameter of the optical receiver becomes large, an electrical parasitic capacity is also large, so that a high-speed response cannot be made. Therefore the response speed is degraded. In addition, if the response speed is prioritized to reduce a size of the receiver to be small, not all the signal lights from the waveguide can enter the optical receiver, and a part thereof becomes wasteful. Consequently the receive-sensitivity is degraded corresponding to the wasteful amount. Accordingly, there is a problem that in a case where the multi-mode converting/coupling element of N-port input/output is used to generate a high-order mode, the response speed or reception sensitivity of the receiver is restricted.

The multi-mode converting/coupling element 1931 is configured of the directional coupler element a waveguide width of which is equal, and thereby the signal light passing through the multi-mode converting/coupling element 1931 is not subjected to mode conversion. Therefore the mode order of the signal light is not increased. In consequence, it is possible to lower the order to be output as compared to a case where only the multi-mode converting/coupling elements are serially connected, as a result making it possible to alleviate a factor of limiting the response speed or reception sensitivity of the receiver. The present configuration has an advantage particularly in a case of using the multi-mode converting/coupling elements each having N inputs and one output in a multi-step manner.

FIG. 20A shows an example of the configuration of the multi-mode coupling element 1950 of two inputs and one output that is used in the optical coupling/splitting device 1900. As shown in FIG. 20A, the multi-mode coupling element 1950 of two inputs and one output has the configuration in which multi-mode waveguide ports of two inputs and two outputs are connected to a multi-mode interferometer (MMI) of a half of a self imaging length.

The multi-mode coupling element 2000 of two inputs and one output is not subjected to mode conversion, and upon receiving a signal light of an even-number order mode, outputs the signal light to the cross port, and upon receiving a signal light of an odd-number order mode, outputs the signal light to the through port. That is, when a signal light of the even number order composed of zeroth, second, fourth or sixth mode order that is output from the first circuit 1930 is input at one input port to the multi-mode coupling element 2000 of two inputs and one output, the signal light of the zeroth, second, fourth or sixth mode order is output from a cross port of the one input port.

When a signal light of the odd number order composed of first, third, fifth or seventh mode order that is output from the second circuit 1940 is input at the other input port to the multi-mode coupling element 2000 of two inputs and one output, the signal light of first, third, fifth or seventh mode order is output from a through port of the other input port. In the output waveguide after the respective optical signals are coupled, the mode order of the optical signal does not overlap. Therefore the mode conversion and coupling of the optical signals is possible without principled losses.

As explained above, in the optical coupling/splitting device 1900 shown in FIG. 19, when the mode order of the signal light that is output from each of the first circuit portion 1930 and the second circuit portion 1940 is appropriately designed and selected, the optical coupling/splitting device having no principled loss as a whole and eight input/output port numbers in the subscriber device side can be realized. In addition, in the optical coupling/splitting device 1900 according to the embodiment 9 in the present invention, it is not necessary to arrange eight multi-mode converting/coupling elements serially, and as compared to a case of using the eight multi-mode converting/coupling elements in the optical coupling/splitting device 1600 according to the embodiment 8, the device length can be made short to about a half thereof. In consequence, it is possible to produce the device without using a relatively expensive, large sized substrate, providing an advantage of reducing production costs of the device.

Further, in place of the multi-mode coupling element of two inputs and one output shown in FIG. 20A, also if the multi-mode converting/coupling element of two inputs and one output shown in FIG. 20B, is used, it is possible to realize the optical coupling/splitting device having the advantage similar to a case shown in FIG. 20A. A multi-mode converting/coupling element 2010 of two inputs and one output shown in FIG. 20B has the configuration in which two kinds of input ports and one output port are connected to the MMI portion of a half of the self imaging length. The first kind of input port 1951 is connected to both ends of an input end surface of the MMI through a Y branch waveguide, and the second kind of input port 1952 is connected to the center of the input end surface of the MMI. The output port 1953 is connected to the center of an output end surface of the MMI.

The first kind of input port 1951 is configured such that an optical path length difference between one waveguide and the other waveguide of the split waveguides from a point where the signal light is bifurcated in the Y split waveguide to a point where the two split signal lights reach the input end surface of the MMI is a half ($\lambda/2$) of a signal light wavelength. In the multi-mode converting/coupling element 2010 of two inputs and one output shown in FIG. 20B, in a case where the mode order N of the signal light that is input to the first kind of input port 1951 is an even number, the signal light is converted into the mode order 2N+1 for output. In addition, in a case where the mode order M of the signal light that is input to the second kind of input port 1952 is an odd number, the signal light is output to the output port in a state of keeping the mode order M without mode conversion, and is coupled to the signal light that is subjected to mode conversion and is output through the first kind of input port 1951. When the mode orders of signal lights that are output respectively from the first circuit portion 1930 and the second circuit portion 1940 are designed to be zeroth, second, fourth and sixth, and third, seventh, eleventh and fifteenth respectively, the mode orders after the coupling of the signal lights in the output waveguide of the multi-mode converting/coupling element 2010 of two inputs and one output become first, fifth, ninth and thirteenth, and third, seventh, eleventh and fifteenth respectively.

As a result, since there is no overlap of the mode order, the mode conversion and coupling is possible without the principled loss. The device length can be also made short as similar to a case where the multi-mode coupling element of two inputs and one output shown in FIG. 20A is used, and as a result, it has the advantage of being able to reduce the production cost of the device without mentioning.

The embodiment 9 is explained using the multi-mode converting/coupling element 1950 of two inputs and one output that has two sets of circuit portions (the first circuit portion 1930 and the second circuit portion 1940), and two inputs, but the optical coupling/splitting device according to the embodiment 9 in the present invention may be configured to be provided with a multi-mode converting and coupling element of N inputs and one output with N sets or more of circuit portions and two or more of inputs (N is an integral number of two or more).

As explained in the above embodiments 7 to 9, the optical coupling/splitting device according to each of the embodiments 7 to 9 is formed of a single kind of optical device, and has the splitting function of the down-signal, the coupling function of the up-signal, and further, the wavelength multiplexing/demultiplexing function of multiplexing/demultiplexing the down-signal and the up-signal together therewith in the optical subscriber network. In addition, a reduction in loss variations between ports, a reduction in production costs, the downsizing of the device size, and the like can be made possible. Therefore these embodiments have an advantage that use of the optical coupling/splitting device according to each of the embodiments 7 to 9 in the present invention enables a practical system that can realize a reduction in initial investment costs, the downsizing of the transmission device, and further, the low failure rate, to be provided in the optical subscriber system.

Embodiment 10

Figure 21:
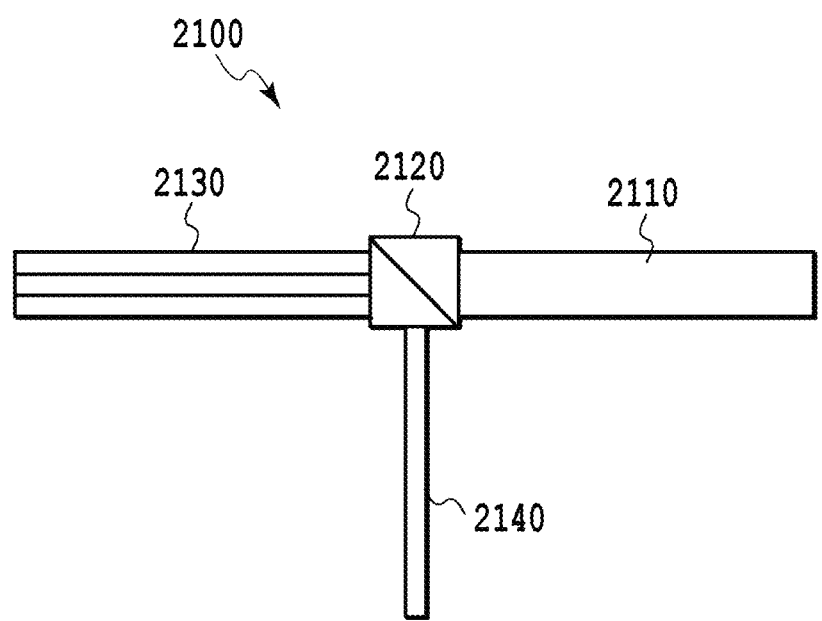
FIG. 21 is a diagram showing a two-way optical propagation device according to an embodiment 10 of the present invention.

FIG. 21 shows a two-way optical propagation device 2100 according to an embodiment 10 in the present invention. FIG. 21 shows the two-way optical propagation device 2100 that includes an MMF 2110, a wavelength multiplexing/demultiplexing device 2120, a DMF 2130, and an SMF 2140. The wavelength multiplexing/demultiplexing device 2120 can include three input/output ports, and the MMF 2110, the DMF 2130, and the SMF 2140 can be respectively connected to the three input/output ports. The wavelength multiplexing/demultiplexing device 2120 can be formed of a WDM filter or an optical circulator.

In the two-way optical propagation device 2100 according to the embodiment 10 in the present invention, an up-signal that is incident to the DMF 2130 from a subscriber device propagates in an MM through the DMF 2130, and is demultiplexed in the wavelength multiplexing/demultiplexing device 2120, which are connected to a core in the MMF 2110. On the other hand, down-signals that are incident to the SMF 2140 are multiplexed in the wavelength multiplexing/demultiplexing device 2120, which propagates in an SM through the DMF 2130.

Embodiment 11

Figure 22:
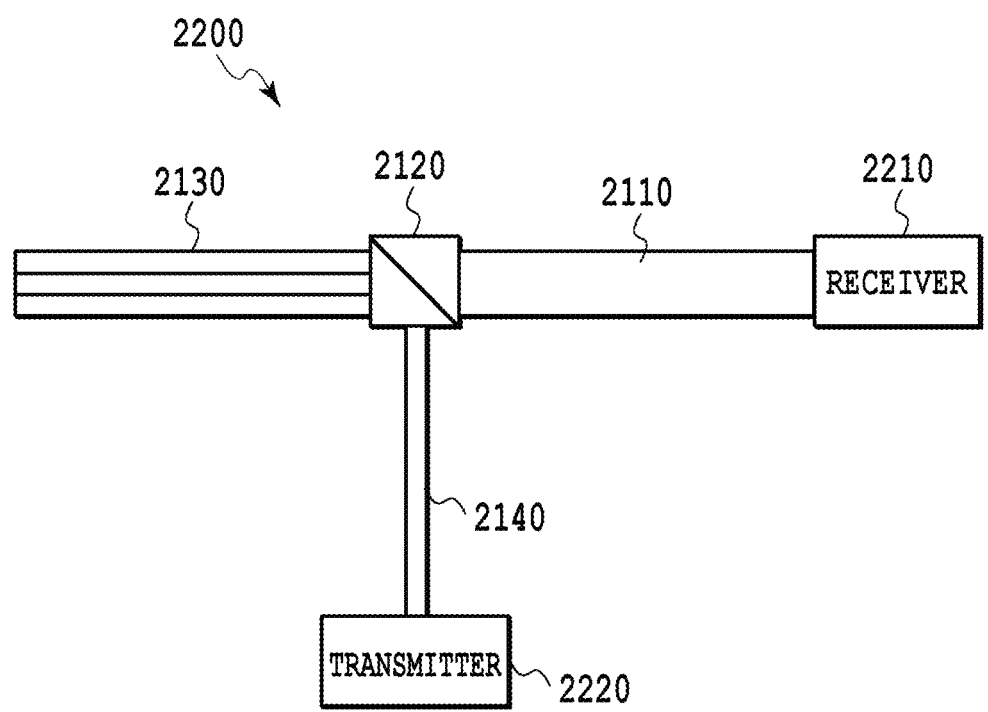
FIG. 22 is a diagram showing an optical transmit-receive system according to an embodiment 11 of the present invention.
Figure 23:
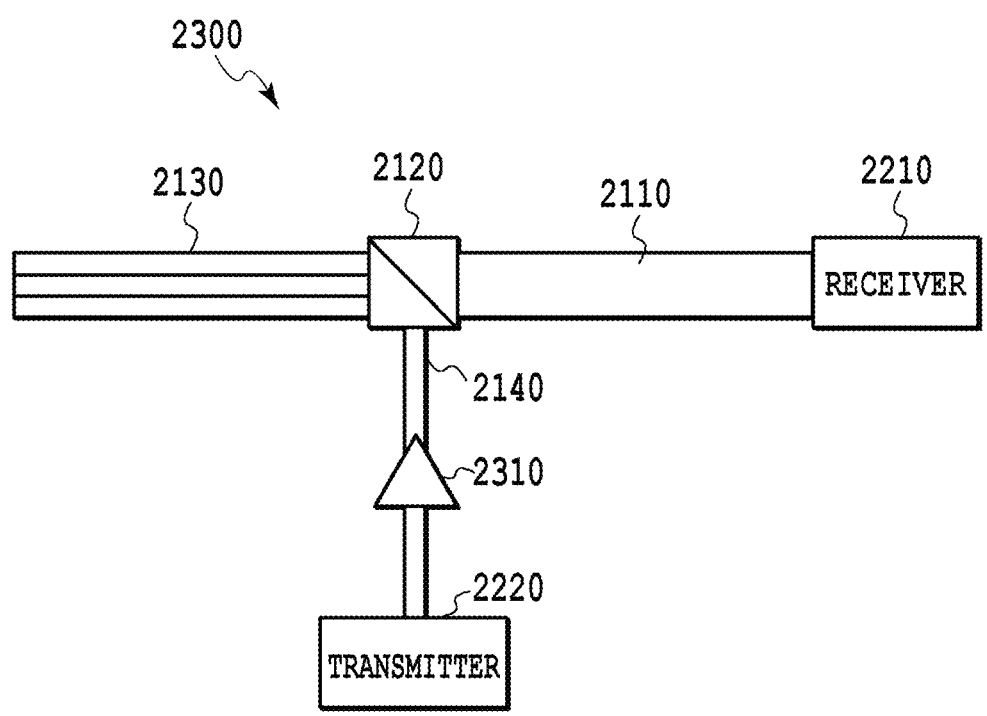
FIG. 23 is a diagram showing another example of the optical transmit-receive system according to the embodiment 11 of the present invention.

FIG. 22 shows an optical transmit-receive device 2200 according to an embodiment 11 in the present invention. As shown in FIG. 22, a receiver 2210 is connected to the MMF 2110 in the two-way optical propagation device 2100 shown in FIG. 21, and a transmitter 2220 is connected to the SMF 2140, thus configuring the optical transmit-receive device 2200. As shown in FIG. 23, an optical amplifier 2310 is connected to the transmitter 2220 through the SMF 2140 in the optical coupling/splitting device 2200 shown in FIG. 22, thus configuring the optical transmit-receive device 2300.

Embodiment 12

Figure 24:
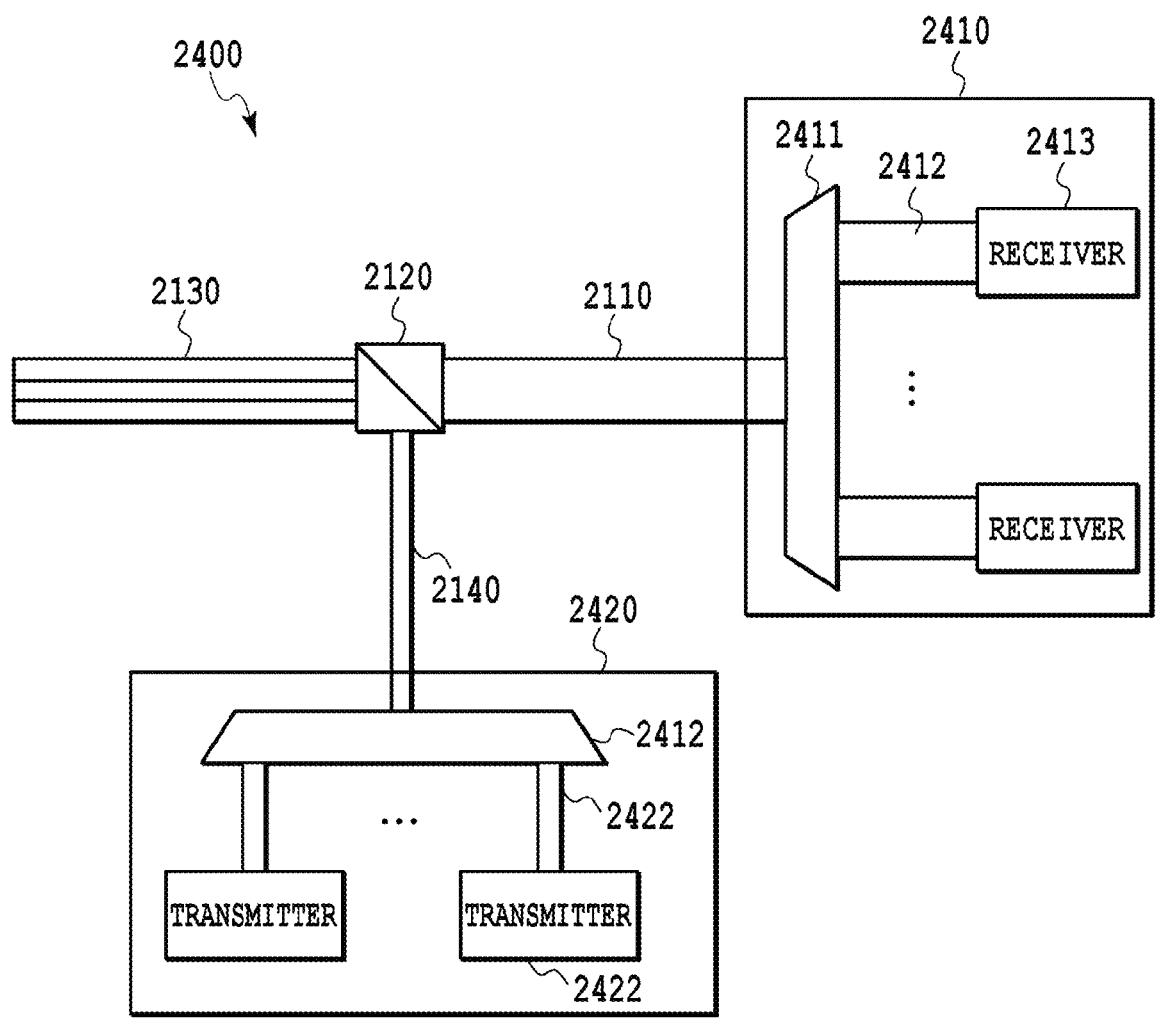
FIG. 24 is a diagram showing an optical transmit-receive system according to an embodiment 12 of the present invention.

FIG. 24 shows an optical transmit-receive device 2400 according to an embodiment 12 in the present invention. FIG. 24 shows the optical transmit-receive device 2400 in which a receiving portion 2410 is connected to the MMF 2110 in the two-way optical propagation device 2100 shown in FIG. 21, and a transmitting portion 2420 is connected to the SMF 2140.

As shown in FIG. 24, the receiving portion 2410 includes a plural-wavelength demultiplexer 2411 that is connected to the MMF 2110, a plurality of MMFs 2412 that are connected to the plural-wavelength demultiplexer 2411, and a plurality of receivers 2413 that are connected respectively to the plurality of the MMFs 2412. The transmitting portion 2420 includes a plural-wavelength multiplexer 2421 that is connected to the SMF 2140, a plurality of SMFs 2422 that are connected to the plural-wavelength multiplexer 2421, and a plurality of transmitters 2423 that are connected respectively to the plurality of the SMFs 2422.

The plural-wavelength demultiplexer 2411 receives input of an up-signal from the MMF 2110, demultiplexes the input up-signal, and outputs the demultiplexed up-signals respectively to the plurality of the receivers 2413 through the plurality of the MMFs 2412. The plural-wavelength multiplexer 2421 receives a down-signal from each of the plurality of the transmitters 2423 through the plurality of the SMFs, multiplexes the received down-signals, and outputs the multiplexed down-signal to the SMF 2140.

It should be noted that FIG. 24 shows the optical transmit-receive device 2400 in which the receiving portion 2410 is connected to the MMF 2110, and the transmitting portion 2420 is connected to the SMF 2140, but an optical transmit-receive device may be configured such that the receiving portion 2410 or the transmitting portion 2420 is connected to either one of the MMF 2110 and the SMF 2140, and the receiving portion 2210 or the transmitting portion 2220 as shown in FIG. 22 is connected to the other. With this configuration, the optical transmit-receive device 2400 in which reception and/or transmission of the optical signal are achieved in the WDM can be realized.

Embodiment 13

Figure 25:
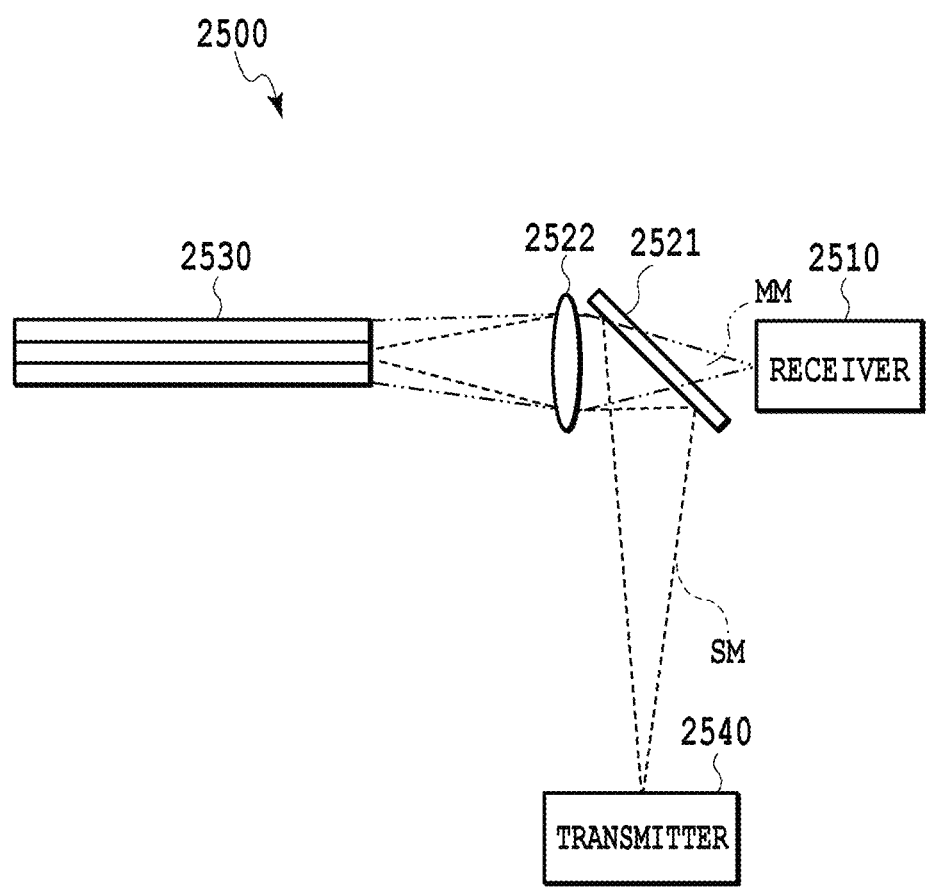
FIG. 25 is a diagram showing an optical transmit-receive system according to an embodiment 13 of the present invention.

FIG. 25 shows an optical transmit-receive device 2500 according to an embodiment 13 in the present invention. FIG. 25 shows the optical transmit-receive device 2500 that is provided with a receiver 2510, a wavelength multiplexing/demultiplexing device 2521, a space lens system 2522, a DMF 2530, and a transmitter 2540. The space lens system 2522 is disposed between the wavelength multiplexing/demultiplexing device 2521 and the DMF 2530. The space lens system. 2522 connects the up-signal to the receiver 2510, and connects the down-signal to an SM core of the DMF 2530.

In the optical transmit-receive device 2500 according to the embodiment 13 in the present invention, the up-signal incident to the DMF 2530 from the subscriber device propagates in an MM through the DMF 2530, transmits the space lens system 2522, and is demultiplexed by the wavelength multiplexing/demultiplexing device 2521, which are received in the receiver 2510. On the other hand, the down-signals transmitted from the transmitter 2540 are multiplexed and reflected by the wavelength multiplexing/demultiplexing device 2521, which transmits the space lens system 2522, and propagates in an SM to be connected to the SM core of the DMF 2530.

Figure 26:
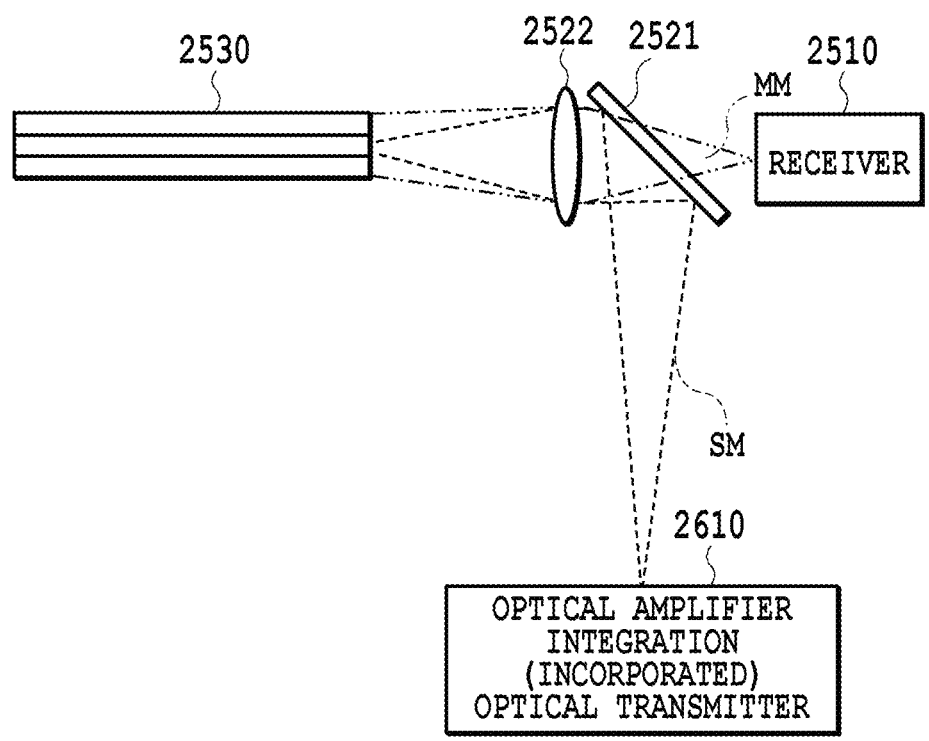
FIG. 26 is a diagram showing another example of the optical transmit-receive system according to the embodiment 13 of the present invention.

In addition, as shown in FIG. 26, an optical transmit-receive device 2600 may be configured using an optical amplifier integrated optical transmitter 2610 incorporating an optical amplifier in the transmitter 2540 in the optical transmit-receive device 2500 shown in FIG. 25.

It should be noted that FIG. 9, FIG. 25 and FIG. 26 each show the space lens system 913 or 2522 in a case where a single lens is used to be arranged between the DMF and the wavelength multiplexing/demultiplexing device, but, not limited thereto, the numbers or the arrangement positions of lens used in the space lens system 913 or 2522 may be changed as needed.

As described above, the present invention is specifically explained with reference to some embodiments, and in terms of many practicable examples to which the principle of the present invention can be applied, the embodiments herein described are illustrative only, and do not limit the scope of the present invention. The embodiments herein illustrated can change the configuration and the details without departing from the spirit of the present invention. Further, components for explanation may be altered, supplemented or changed in order without departing from the spirit of the present invention.

INDUSTRIAL APPLICABILITY

The present invention can be used as the optical coupling/splitting device, the two-way optical propagation device and the optical transmit-receive system that are used in the optical subscriber network.

The invention claimed is:

1. An optical coupling/splitting device, comprising:
an optical coupling/splitting means configured to couple a plurality of up-signals in a multi mode for output and also configured to split a down-signal in a single mode for output; and
a two-way optical propagation means configured to propagate the up-signal output from the optical coupling/splitting means in a multi mode for output and also configured to propagate the down-signal in a single mode to be output to the optical coupling/splitting means,
wherein the two-way optical propagation means is formed of a space lens system, the space lens system being configured such that the up-signal output from the optical coupling/splitting means is transmitted therein to be output in a multi mode and the down-signal is transmitted therein to be output to the optical coupling/splitting means in a single mode.

2. An optical transmit-receive system comprising:
an optical coupling/splitting device comprising:
an optical coupling/splitting means configured to couple a plurality of up-signals in a multi mode for output and also configured to split a down-signal in a single mode for output;
a two-way optical propagation means configured to propagate the up-signal output from the optical coupling/splitting means in a multi mode for output and also configured to propagate the down-signal in a single mode to be output to the optical coupling/splitting means, the two-way optical propagation means being formed of a dual-mode optical fiber; and
a multiplexing/demultiplexing means configured to demultiplex the up-signal that propagates in the dual-mode optical fiber in a multi-mode and also configured to multiplex the down-signal in a single mode, and
a transmitter and a receiver both connected to the optical coupling/splitting device, the transmitter for transmitting the down-signal and the receiver for receiving the coupled up-signal.

3. The optical transmit-receive system according to claim 2, wherein an optical amplifier for amplifying the down-signal is connected to the transmitter.

4. An optical coupling/splitting device, comprising:
an optical coupling/splitting means configured to couple a plurality of up-signals in a multi mode for output and also configured to split a down-signal in a single mode for output; and
a two-way optical propagation means configured to propagate the up-signal output from the optical coupling/splitting means in a multi mode for output and also configured to propagate the down-signal in a single mode to be output to the optical coupling/splitting means, the two-way optical propagation means being formed of a dual-mode optical fiber,
wherein the optical coupling/splitting means is formed in a planar lightwave circuit, and comprises:
a slab waveguide optically connected to the dual-mode optical fiber; and
a plurality of single mode waveguides optically connected to the slab waveguide and a plurality of single mode optical fibers, the slab waveguide including:
a core lacking portion provided on an optical axis extension line of the dual-mode optical fiber to be line-symmetric around the optical axis extension line of the dual-mode optical fiber.

5. The optical coupling/splitting device according to claim 4, wherein the core lacking portion is formed in an elliptical shape.

6. The optical coupling/splitting device according to claim 4, wherein the core lacking portion comprises:
a plurality of first core lacking sections provided in an opening angle range of a multi-mode portion of the dual-mode optical fiber; and
a second core lacking section provided in an opening angle range of a single-mode portion of the dual-mode optical fiber, the second core lacking section having curvature that is larger than that of each of the first core lacking sections.

7. The optical coupling/splitting device according to claim 4, wherein the slab waveguide is formed of a reflection rate intensifying structure configured to reflect the down-signal and the up-signal for being confined in the slab waveguide.

8. The optical coupling/splitting device according to claim 4, wherein
waveguide widths of the single-mode waveguides respectively differ from each other in a connecting portion to the slab waveguide, and
points where optical axis extension lines of the single-mode waveguides in the connecting portion cross an optical axis extension line of the dual-mode optical fiber differ from each other for each of the single-mode waveguides.

9. An optical coupling/splitting device, comprising:
an optical coupling/splitting means configured to couple a plurality of up-signals in a multi mode for output and also configured to split a down-signal in a single mode for output; and
a two-way optical propagation means configured to propagate the up-signal output from the optical coupling/splitting means in a multi mode for output and also configured to propagate the down-signal in a single mode to be output to the optical coupling/splitting means,
wherein the optical coupling/splitting means comprises:
a slab waveguide for coupling the plurality of the up-signals in a multi-mode and splitting the down-signal in a single mode;
a multi-mode optical fiber to which the up-signal that is output through the slab waveguide is input to be propagated in a multi-mode; and
a plurality of single-mode optical fibers to which the down-signal that is output through the slab waveguide is input to be propagated in a single mode, the slab waveguide comprising:
an input port for input of the down-signal; and
a filter portion that is disposed in the slab waveguide to be inclined by a predetermined angle to an optical axis of the multi-mode optical fiber such that the down-signal that is input through the input port is reflected thereon to be output to the plurality of the single mode optical fibers, and the up-signal is transmitted therein to be output to the multi-mode optical fiber.

10. An optical coupling/splitting device, comprising:
an optical coupling/splitting means configured to couple a plurality of up-signals in a multi mode for output and also configured to split a down-signal in a single mode for output; and
a two-way optical propagation means configured to propagate the up-signal output from the optical coupling/splitting means in a multi mode for output and also configured to propagate the down-signal in a single mode to be output to the optical coupling/splitting means,
wherein the optical coupling/splitting means comprises:
a splitting element for splitting the down-signal;
a plurality of single mode optical fibers for input/output of each of the plurality of the up-signals and the split down-signals; and
a plurality of multi-mode converting/coupling elements to which the split down-signals are respectively input to be output to the plurality of the single mode optical fibers respectively for coupling the plurality of the up-signals, which are input through the plurality of the single mode optical fibers, in a multi-mode.

11. The optical coupling/splitting device according to claim 10, wherein each of the plurality of the multi-mode converting/coupling elements is formed of a directional coupler element a waveguide width of which is a non-equal width,
the up-signal is subjected to mode conversion, which is thereafter output to a cross port of the multi-mode converting/coupling element, and
the down-signal is output to a through port of the multi-mode converting/coupling element without the mode conversion.

12. The optical coupling/splitting device according to claim 10, wherein
the splitting element is formed of an equal distribution optical splitter element for splitting the down-signal such that each optical intensity of the split down-signals becomes equal,
the plurality of the multi-mode converting/coupling elements are connected in series through the multi-mode waveguide, and
a down-signal input port of each of the plurality of the multi-mode converting/coupling elements connected in series is connected to the equal distribution optical splitter element.

13. The optical coupling/splitting device according to claim 12, wherein the plurality of the multi-mode converting/coupling elements are formed of N sets of the multi-mode converting/coupling elements connected in series, and the optical coupling/splitting element further comprises:
a multi-mode converting/coupling element of N inputs and one output that is connected through a multi-mode waveguide to each set of the N sets of the multi-mode converting/coupling elements connected in series, wherein the up-signal that is subjected to multi-mode conversion and coupling in each set of the N sets of the multi-mode converting/coupling elements connected in series is subjected to multi-mode conversion and coupling in the multi-mode converting/coupling element of N inputs and one output.

14. The optical coupling/splitting device according to claim 12, further comprising:
a directional coupler element a waveguide width of which is a non-equal width for wavelength-multiplexing/demultiplexing the up-signal and the down-signal,
wherein
the directional coupler element of the equal width is connected in series to the plurality of the multi-mode converting/coupling elements through the multi-mode waveguide, and
a down-signal input port of the directional coupler element of the equal width is connected to the equal distribution optical splitter element.

15. The optical coupling/splitting device according to claim 9, wherein the two-way optical propagation means includes:
the single mode optical fiber to which the down-signal is input to be output to the optical coupling/splitting means; and
a multi-mode optical fiber to which the up-signal that is output from the optical coupling/splitting means is input.

* * * * *